(12) United States Patent
Collina et al.

(10) Patent No.: US 6,992,153 B1
(45) Date of Patent: Jan. 31, 2006

(54) MULTI-STAGE PROCESS FOR THE (CO) POLYMERIZATION OF OLEFINS

(75) Inventors: Gianni Collina, Cassana (IT); Edward Bryan Coughlin, Amherst, MA (US); Giuliano Cecchin, Ferrara (IT); Giovanni Baruzzi, Ferrara (IT); Anna Fait, Ferrara (IT)

(73) Assignees: Basell Polyolefine GmbH, Weselling (DE); E.I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/936,111

(22) PCT Filed: Mar. 6, 2000

(86) PCT No.: PCT/EP00/01924

§ 371 (c)(1),
(2), (4) Date: Jan. 16, 2002

(87) PCT Pub. No.: WO00/53646

PCT Pub. Date: Sep. 14, 2000

(30) Foreign Application Priority Data

Mar. 9, 1999 (EP) .................................. 99200698

(51) Int. Cl.
C08F 2/38 (2006.01)
C08F 2/00 (2006.01)
C08F 4/80 (2006.01)

(52) U.S. Cl. ............................ 526/75; 526/78; 526/82; 526/161; 526/172; 502/109; 502/162; 502/167

(58) Field of Classification Search ................ 502/109, 502/162, 167; 526/74, 172, 161, 115, 78, 526/82, 75, 113
See application file for complete search history.

(56) References Cited

U.S. PATENT DOCUMENTS

| | | | |
|---|---|---|---|
| 4,298,718 A | 11/1981 | Mayr et al. ................. | 526/125 |
| 4,495,338 A | 1/1985 | Mayr et al. ................. | 526/125 |
| 4,521,566 A | 6/1985 | Galli et al. ................. | 525/247 |
| 5,589,549 A * | 12/1996 | Govoni et al. .............. | 525/247 |
| 5,672,665 A | 9/1997 | Agapiou et al. ............ | 526/82 |
| 5,759,940 A * | 6/1998 | Sacchetti et al. | |
| 6,136,743 A | 10/2000 | Sugimura et al. ........... | 502/113 |
| 6,194,341 B1 * | 2/2001 | Canich et al. .............. | 502/113 |

FOREIGN PATENT DOCUMENTS

| | | |
|---|---|---|
| EP | 0361493 | 4/1990 |
| EP | 0361494 | 4/1990 |
| EP | 0362705 | 4/1990 |
| EP | 0395083 | 10/1990 |
| EP | 0451645 | 10/1991 |
| EP | 0553805 | 8/1993 |
| EP | 0553806 | 8/1993 |
| EP | 0575875 | 12/1993 |
| EP | 0728769 | 8/1996 |
| EP | 0789037 | 8/1997 |
| EP | 0893455 | 1/1999 |
| JP | 09278821 | 10/1997 |
| JP | 09278822 | 10/1997 |
| WO | 9602580 | 2/1996 |
| WO | 9602583 | 2/1996 |
| WO | 9612218 | 4/1996 |
| WO | 9623010 | 8/1996 |
| WO | 9702298 | 1/1997 |
| WO | 9738024 | 10/1997 |
| WO | 9748735 | 12/1997 |
| WO | 9748736 | 12/1997 |
| WO | 9827124 | 6/1998 |
| WO | 9830609 | 7/1998 |
| WO | 9830612 | 7/1998 |
| WO | 9840374 | 9/1998 |
| WO | 9842664 | 10/1998 |
| WO | 9842665 | 10/1998 |
| WO | 9844009 | 10/1998 |
| WO | 9849208 | 11/1998 |
| WO | 9921899 | 5/1999 |
| WO | 0011057 | 3/2000 |
| WO | 0022007 | 4/2000 |
| WO | 0121674 | 3/2001 |

OTHER PUBLICATIONS

Johnson, Lynda K. et al., J. Am. Chem. Soc., 117: 6414-6415 (1995).
Johnson, Lynda K. et al., J. Am. Chem. Soc., 118: 267-268 (1996).
Small, Brooke L. et al., J. Am. Chem. Soc., 120: 4049-4050 (1998).

* cited by examiner

Primary Examiner—Caixia Lu
(74) Attorney, Agent, or Firm—William R. Reid; Jarrod N. Raphael

(57) ABSTRACT

Multi-stage process for the polymerization of olefins $CH_2=CHR$, where R is hydrogen or a $C_1$–$C_{10}$ alkyl, cycloalkyl or aryl radical, comprising: (I) a first polymerization stage carried out in the presence of a catalyst comprising the product of the reaction between an alkyl-Al compound and a solid component comprising at least one compound of transition metal $M^1$ not containing $M^1$-$\pi$ bonds, thus obtaining a porous polymer, (II) a treatment stage, wherein said porous polymer is contacted with a compound capable of deactivating the catalyst used in stage (I) and with a late transition metal complex; and (III) a second stage of polymerization, carried out in the presence of the product obtained from treatment stage (II).

29 Claims, 1 Drawing Sheet

MULTI-STAGE PROCESS FOR THE (CO) POLYMERIZATION OF OLEFINS

FIELD OF THE INVENTION

Figure 1:
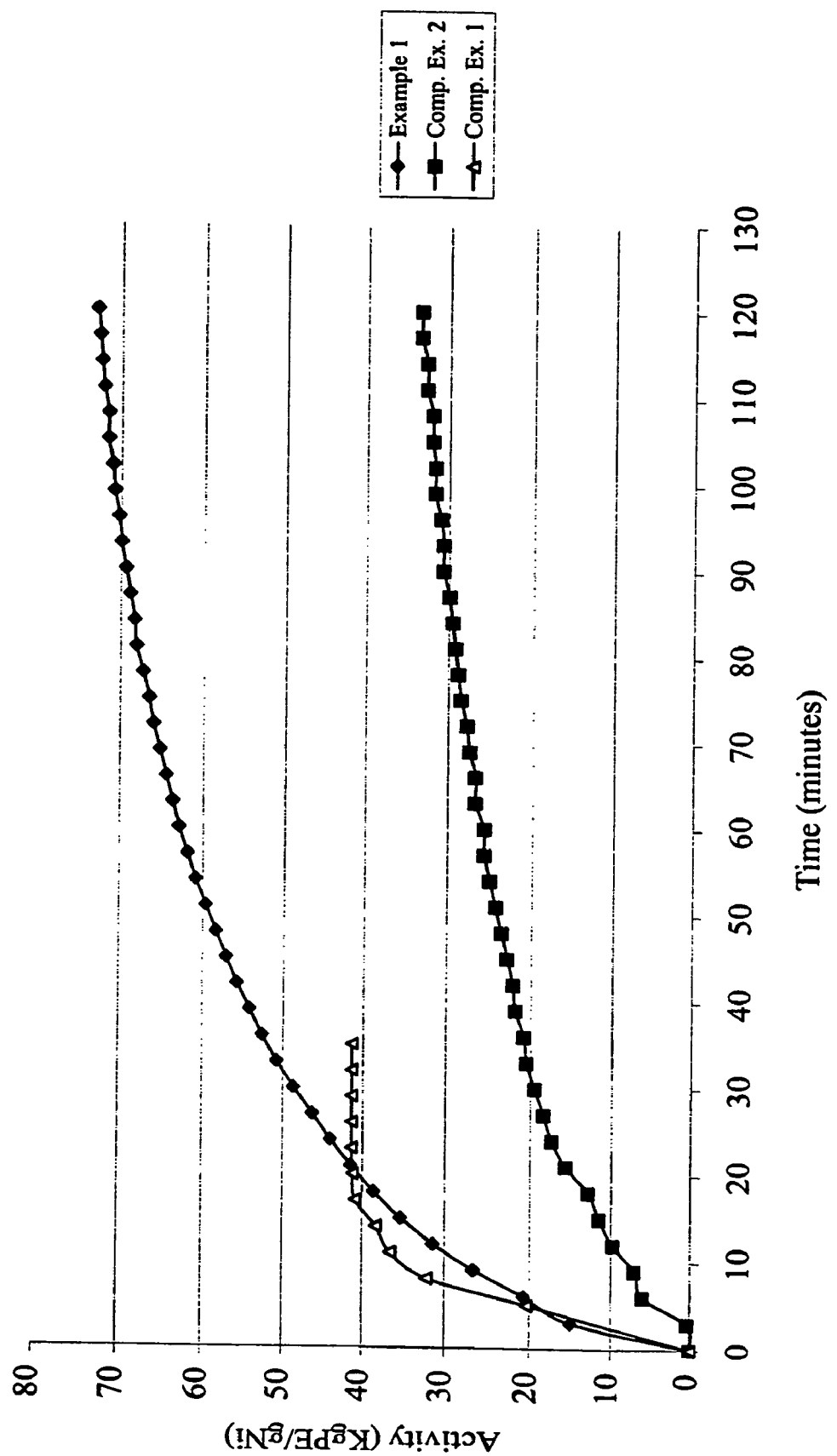

The present invention relates to a multi-stage process for the homo or copolymerization of olefin monomers, comprising (I) a first polymerization stage in the presence of a Ti or V catalyst, thus obtaining a polymer that has particular values of porosity; (II) a treatment stage wherein the Ti or V catalyst is optionally deactivated and a late transition metal catalyst is supported on the porous polymer, optionally in the presence of a suitable cocatalyst; and (III) a final polymerization stage, thus obtaining new polymer compositions directly from the reactors.

BACKGROUND OF THE INVENTION

Early transition metal catalysts for olefin polymerization are well-known in the state of the art and comprise the traditional Ziegler-Natta catalysts based on Group 4 and 5 of the Periodic Table (IUPAC notation) and the newer metallocene catalysts, based on Group 4–6 metals. These catalysts systems have been widely used in single-stage processes for olefin polymerization, as well as in multi-stage processes, the latter providing much greater flexibility in controlling the composition and the properties of the end product compared to the former ones.

Multi-stage processes are generally carried out by using the same catalyst in the various stages/reactors, by utilizing tandem reactors operated in series: the product obtained in one reactor is discharged and sent directly to the next stage/reactor, without altering the nature of the catalyst. For example, broad or multi-modal molecular weight distribution (MWD) polyethylenes are commonly prepared by employing a process, wherein ethylene is polymerized in various reactors containing the same catalyst but in the presence of different concentrations of molecular weight regulators.

Multi-stage processes are also used in the preparation of high-impact copolymers of propylene, by sequential polymerization of propylene and of mixtures of propylene with ethylene. For instance, U.S. Pat. No. 4,521,566 describes the preparation of high impact strength polypropylene compositions in a multi-stage process which comprises at least one stage of homopolymerization of propylene and at least one stage of polymerization of ethylene/propylene mixtures in the presence, in both stages, of a catalyst comprising a compound of titanium supported on a magnesium halide.

The international patent application WO 96/02583 describes a multi-stage process wherein different catalyst systems are used in the various stages, in order to allow the obtainment of a wide range of olefinic polymer compositions. More specifically, while in the first stage of the polymerization is carried out in the presence of a Ziegler-Natta catalyst system, in the second polymerization stage a metallocene/alumoxane catalyst system is used, comprising a compound of a transition metal M selected from Ti, V, Zr and Hf, containing at least one M-π bond, and alkyl-Al compound.

The international patent application WO 96/11218 describes a similar process, with the difference that the first polymerization stage is followed by an intermediate stage wherein the catalyst used in the first stage is deactivated, before contacting the obtained polymer with the metallocene/alumoxane system of the second polymerization stage.

In the last years a new family of catalysts for olefin polymerization, based on late transition metals, have been developed in the art; the new catalysts, containing complexes of metals belonging to Groups 8–11 of the Periodic Table of the Elements (new IUPAC notation), exhibit characteristics different from those of transition metal metallocene catalysts or traditional Ziegler-Natta catalysts when used in olefin polymerization.

L. K. Johnson et al. (*J. Am. Chem. Soc.*, 117: 6414–6415, 1995 and *J. Am. Chem. Soc.*, 118: 267–268, 1996) describe the use of Ni and Pd complexes with bidentate α-diimine ligands, useful as catalyst components in ethylene, propylene or 1-hexene polymerization; said complexes are activated with $H^+(OEt_2)_2[B(3,5-(CF_3)_2C_6H_3)_4]^-$, methylalumoxane (MAO) or $Et_1AlCl$. These systems have the ability to produce highly branched polymers for ethylene and to copolymerize ethylene with polar monomers.

A class of late transition metal complexes of bidentate α-diimine or β-diimine ligands was disclosed in WO 96/23010; said complexes, activated with halo-aluminum alkyl derivatives, MAO or alkylboronic acid derivatives, are used in the oligomerization and polymerization of α-olefins, and in particular of ethylene, and in the copolymerization of ethylene with polar monomers.

Bidentate ligands, which are useful in the preparation of Ni complexes active in the polymerization of ethylene, norbornenes and styrenes, are described in the international patent application WO 97/02298; the corresponding complexes are used in association with acids of a non coordinating monoanion of formula HX, wherein the anion X is preferably $BF_4^-$, $PF_6^-$, BAF (i.e. tetrakis[3,5-bis(trifluoromethyl)phenyl]borate) or $SbR_6^-$.

WO 98/40374 describes olefin polymerization catalysts containing Group 8–10 metals and bidentate ligands having the following formula:

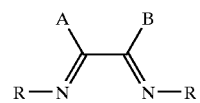

wherein the substituents R can be hydrocarbyl, substituted hydrocarbyl or silyl; A and B are heteroatom connected monoradicals, wherein the connected heteroatom is selected from Group 15 or 16, and A and B may be linked by a bridging group; these catalysts optionally contain a Brønsted or Lewis acid as cocatalyst.

Recently, Brooke L. Small et al. (*J. Am. Chem. Soc.* 120:4049–4050, 1998) disclosed Fe(II) and Co(II) catalyst systems incorporating tridentate pyridine diimine ligands of the following general structure:

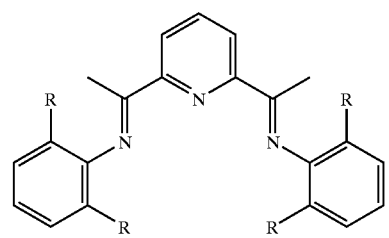

wherein R is H, methyl or iso-propyl. The active catalysts, generated by the addition of MAO, are able to convert ethylene to linear high density polyethylene; increasing the steric bulk of the ortho aryl substituents increases molecular weight.

The polymerization of ethylene and propylene with the above-mentioned complexes of pyridine bisimine, and more specifically of 2,6-pyridinecarboxaldehyde bis(imines) and 2,6-diacylpyridine bis(imines), is described in WO 98/27124 and WO 98/30612, wherein the above catalysts are activated with MAO, boron compounds and aluminum alkyl compounds.

The above-described late transition metal catalyst systems have also been used in association with conventional Ziegler-Natta catalyst. International patent applications WO 97/38024 describes polymerization catalyst systems comprising (a) a cyclopentadienyl derivative of a Group 4 transition metal or a catalyst comprising magnesium, titanium and halogen; and (b) a complex of a bidentate ligand with a group 8–10 transition metal compound; in association with suitable cocatalysts. By using at the same time a mixture of the two different catalysts, olefin polymers having a broad molecular weight distribution and excellent formability are obtained.

Moreover, WO 97/48735 concerns a mixed olefin polymerization catalyst system comprising:
one late transition metal catalyst system, consisting of a Group 9–11 metal complex stabilized by a bidentate ligand; and
at least one different catalyst system, selected from a Group 4 metallocene catalyst system and a Ziegler-Natta catalyst system.

Because late transition metal catalysts may respond differently to reactor conditions than either metallocene or traditional Ziegler-Natta catalysts, by selecting the proper reactor conditions, polymer blends having the desired molecular weight distribution and composition distribution can be obtained. Also in this case, both the catalytic systems are used together in a single reactor.

Finally, the above-mentioned late transition metal catalysts were also supported on inorganic carriers, such as $SiO_2$ and $Al_2O_3$, and the obtained supported systems were used in olefin polymerization. For instance, WO 97/48736 describes late transition metal catalyst systems comprising a Group 9–11 metal complex immobilized on a solid metal or metalloid oxide particle support, particularly silica, and their use in heterogeneous polymerization processes.

Catalysts based on late transition metal complexes supported on fine particle carriers consisting of inorganic oxides, such as $Al_2O_3$ and $SiO_2$, for use in suspension and gas-phase polymerization processes, were described in JP 09-278821 and JP 09-278822 too; polymers having narrow composition distributions and superior particle performances are obtained.

Nevertheless, the supportation on silica and alumina of late transition metal catalyst leads to lower catalytic activities in comparison with homogeneous polymerization reactions; moreover, the supportation causes a substantial decrease of the branch-producing tendencies (branches/1000 carbon atoms) of these catalysts, thus leading to polymers having greater melting points and lower processability; the branching decrease is estimated around 10–15% in the above-mentioned WO 97/48736.

Therefore, it is felt the need of increasing the catalytic activity of late transition metal complexes with respect to the activities exerted in homogeneous polymerizations and in heterogeneous systems wherein silica or alumina catalysts are used, at the same time preserving the branching-tendency of these catalysts.

SUMMARY OF THE INVENTION

The applicant has now found that late transition metal catalysts can be advantageously used in a multi-stage process, said process comprising a first polymerization stage using a Ziegler-Natta Ti or V catalyst to prepare an olefinic polymer endowed with a particular porosity value; and a second polymerization stage, carried out in the presence of the thus obtained porous polymer on which is supported a late transition metal catalyst. By means of the above process, late transition metal systems exert an unexpectedly enhanced catalytic activity and the obtained polymers show an increased number of total branches. More specifically, the multi-stage process according to the present invention comprises:

(I) a first polymerization stage, wherein one or more olefins of formula $CH_2=CHR$, wherein R is hydrogen or a linear or branched, saturated or unsaturated $C_1$–$C_{10}$ alkyl, cycloalkyl or aryl radical, are polymerized in one or more reactors, in the presence of a catalyst comprising the product of the reaction between an alkyl-Al compound and a solid component comprising at least one compound of a transition metal $M^I$ chosen between Ti and V, and not containing $M^I$-π bonds, and a halide of Mg, in order to produce an olefinic polymer having porosity, expressed as percentage of voids, greater than 5%.

(II) a treatment stage, wherein the product obtained in said first polymerization stage (I) is, in any order whatever:
 (a) optionally contacted with a compound capable of deactivating the catalyst used in stage (I); and
 (b) contacted with a late transition metal complex, optionally in the presence of a suitable activating agent; and (III) a second polymerization stage, wherein one or more olefinic monomers are polymerized in one or more reactors, in the presence of the product obtained from stage (II).

Another object of the present invention is a catalyst component comprising a late transition metal complex supported on a polymeric porous support, having a porosity, expressed as percentage of voids, greater than 5%; said catalyst component may be suitably obtained by a process comprising:

(I) a polymerization stage, wherein one or more olefins of formula $CH_2=CHR$, wherein R is hydrogen or a linear or branched, saturated or unsaturated $C_1$–$C_{10}$ alkyl, cycloalkyl or aryl radical, in the presence of a catalyst comprising the product of the reaction between one or more alkyl-Al compounds and a solid component comprising at least one compound of a transition metal $M^I$ chosen between Ti and V, and not containing $M^I$-π bonds, and a halide of Mg;

(II) a treatment stage, wherein the product obtained in the polymerization stage (I) is, in any order whatever;
 (a) optionally contacted with one or more compounds capable of deactivating the catalyst used in step (I); and
 (b) contacted with one or more late transition metal complexes, optionally in the presence of a suitable activating agent.

DETAILED DESCRIPTION OF THE INVENTION

The multi-stage process for the polymerization of olefinic monomers and the supported catalyst component, according to the present invention, will be better described in the following detailed description.

FIG. 1 shows three graphs wherein it is plotted the polymerization activity of late transition metal catalysts vs. polymerization time when used in the multi-stage process according to the present invention, when used unsupported in a homogeneous polymerization and when used supported on silica, according to the processes known in the state of the art.

In the first polymerization stage (I) of the multi-stage process of the invention, one or more olefins of formula $CH_2$=CHR, wherein R is hydrogen or a linear or branched, saturated or unsaturated $C_1$–$C_{10}$ alkyl, cycloalkyl or aryl radical, are homopolymerized or copolymerized in the presence of a Ziegler-Natta catalyst, thus obtained a polymer having specified porosity values.

The catalyst used in the first stage of polymerization (I) comprises the product of the reaction between:

(A) a solid component comprising a compound of a transition metal $M^I$ chosen between Ti and V and not containing $M^I$-π bonds, supported on a halide of magnesium. The solid component can also comprise an electron-donating compound (internal donor). As a rule, the internal donor are useful when the solid component is used in catalysts for the stereospecific polymerization of propylene, 1-butylene and similar α-olefins, where increased stereospecificity is necessary to obtain polymers with an index of isotacticity greater than 90;

(B) an alkyl-Al compound and optionally an electron-donating compound (external donor).

When steroregular polymers are produced in the first stage of polymerization (I), for example polymers of propylene with high index of isotacticity, one or more external donors are used in order to impart the necessary increased stereospecificity to the catalyst. However, when diethers of the type described in patent EP-A-361493 or EP-A-728769 are employed as internal donors, the stereospecificity of the catalyst is sufficiently high and does not require the use of external donors.

The catalyst must be capable of giving a polymer with porosity greater than 5%.

The halides of magnesium, preferably $MgCl_2$, and more preferably $MgCl_2$ in active form, used as support for Ziegler-Natta catalysts, are widely known from the patent literature. For instance, U.S. Pat. No. 4,298,718 and U.S. Pat. No. 4,495,338 describe the use of these compounds in Ziegler-Natta catalysis.

It is known to the skilled person that active forms of magnesium halides, commonly used as support or co-support in catalyst components for the polymerization of olefins, are characterized by X-ray spectra wherein the most intense diffraction line appearing in the spectrum of the non-active halide is diminished in intensity and is replaced by a halo, whose maximum intensity is shifted towards lower angles compared with those of the more intense line.

Said compound of the transition metal $M^I$ is preferably selected from the group consisting of halides of titanium, halo alkoxides of titanium, $VCl_3$, $VCl_4$, $VOCl_3$ and halo alkoxides of vanadium.

Among the compounds of titanium, those preferred are $TiCl_4$, $TiCl_4$, and the halo alkoxides of formula $Ti(OR^I)_m X_n$, wherein $R^I$ is a $C_1$–$C_{12}$ hydrocarbon radical a —$COR^I$ group, X is halogen and (m+n) corresponds to the oxidation state of titanium.

The catalytic component (A) can be advantageously employed in the form of spherical particles having a mean diameter ranging from about 10 to 150 μm. Suitable methods for the preparation of said components are reported in EP-A-395083, EP-A-553805, EP-A-553806 and WO 98/44009.

Suitable internal electron-donating compounds (internal donors) comprise ethers, esters (particularly esters of polycarboxylic acids), amines, ketones and 1,3-diethers are described in EP-A-361493, EP-A-361494, EP-A-362705, EP-A-451645 and EP-A-728769.

By "alkyl-Al compound" is meant any compound in which at least one alkyl group is bound to an aluminum atom; said alkyl-Al compound (B) is preferably a trialkylaluminium, more preferably selected from the group consisting of triethyl-Al, triisobutyl-Al, tri-n-butyl-Al, tri-n-hexyl-al and tri-n-octyl-Al. It is also possible to use mixtures of trialkyl-Al's with alkyl-al halides or alkyl-Al sesquichlorides, such as $AlEt_2Cl$ and $Al_2Et_3Cl_3$.

Said external donor can be the same as or different from the internal donor. When the internal donor is the ester of a polycarboxylic acid, in particular a phthalate, the external donor is preferably a silicon compound having formula $R^{II}R^{III}Si(OR)_2$, where $R^{II}$ and $R^{III}$ are linear or branched, saturated or unsaturated $C_1$–$C_{18}$ alkyl, cycloalkyl or aryl radicals. Examples of such silanes are methyl-cyclohexyldimethoxysilane, diphenyldimethoxysilane, methyl-t-butyldimethoxysilane, dicyclopentyl-dimethoxysilane and thexyl-trimethoxy-silane.

The first polymerization stage (I) can be effected in liquid phase or in gas phase, working in one or more reactors. The liquid phase can consist of an inert hydrocarbon solvent (suspension process) or of one or more olefins $CH_2$=CHR (liquid monomer process). Gas-phase polymerization can be effected using the known fluidized-bed technique or working in conditions of which the bed is mechanically stirred.

Said olefin $CH_2$=CHR, wherein R has the meaning reported above, is preferably selected from the group consisting of ethylene, propylene, 1-butene, 1-pentene, 4-methylpentene, 1-hexene, 1-octene and mixtures thereof.

According to a preferred embodiment of the invention, the porous homopolymer or copolymer obtained in the first polymerization stage (I) has a porosity, expressed as percentage of voids greater than 5%, and preferably greater than 10%. Porosity values of 35–40% or greater are particularly advantageous. It is moreover preferable that the polymers produced in the first stage of polymerization (I) possess macroporosity. In general, more than 40% of the porosity of the said polymers is due to pores with diameter greater than 10,000 Å. In the case where the porosity of the polymer produced in the first stage of polymerization (I) is greater than 15%, the distribution of pore radius is preferably such that more than 90% of the porosity is due to pores with diameter greater than 10000 Å. The porosity, expressed as percentage of voids, and the distribution of pore radius are determined by the mercury method described later.

The quantity of polymer produced in the first stage of polymerization (I) is greater than 0.5 g/g of said solid component (A), preferably greater than 1000 g/g, and more preferably greater than 3000 g/g.

The amount of polymer produced in the first polymerization stage (I) is preferably between 10 and 90% by weight relative to the total amount of polymer produced in stages (I) and (III), and more preferably is between 20 and 80%.

The first stage of polymerization (I) is preferably preceded by a stage of prepolymerization in which propylene or its mixtures with one or more olefins $CH_2$=CHR are polymerized in the presence of the catalyst described in (I) in a quantity of between 5 and 500 g/g catalyst. Prepolymerization is preferably effected in liquid propylene or in an inert hydrocarbon solvent, for example propane.

The first stage of polymerization (I) is preferably effected in one or more fluidized-bed reactors in the gas phase, into which the prepolymer produced is fed preferably continuously, recycled monomers and optionally a molecular weight regulator, an inert gas and an alkyl-Al compound are fed to the first stage of polymerization (I).

According to an embodiment of the process of the invention, the first polymerization step (I) may comprise one or more steps, for instance a step (i) to form a crystalline polymer component and a step (ii) to form a low-crystalline, non-crystalline or elastomeric polymer component, said steps (i) and (ii) being carried out in an arbitrary order, so as to form a block polymer product.

In the treatment stage (II), the product obtained in the first polymerization stage (I) is, in any order whatever:

(a) optionally contacted with a compound capable of deactivating the catalyst used in stage (I); and (b) contacted with a late transition metal complex, optionally in the presence of a suitable activating agent.

In step (a), the porous polymer produced in the first polymerization stage (I) is preferably contacted with a compound able to deactivate the catalyst used in said stage (I). Useful deactivating compounds have formula $R^{IV}_{y-1}XH$, wherein $R^{IV}$ is hydrogen or a $C_1$–$C_{10}$ hydrocarbon radical, X is O, N, or S, and y corresponds to the valence of X. Non-limiting examples of said deactivating compounds are alcohols, thioalcohols, mono- and di-alkylamines. Preferred deactivating compounds are those corresponding to the above formula, wherein X=O.

According to a preferred embodiment of the process of the invention, said deactivating compound is selected from the group consisting of $H_2O$, $NH_3$, $H_2S$, CO, COS, $CS_2$, $CO_2$ and $O_2$; even more preferably, said deactivating agent is $H_2O$.

The molar ratio between said deactivating compound and the compound of the transition metal $M^I$ must ensure the substantial deactivation of the catalyst used in stage (I). The value of said ratio is preferably greater than 50, more preferably greater than 150, and even more preferably ranging from 250 to 1000. The deactivation treatment (a), wherein the deactivating compound is brought into contact with the polymer obtained from the first polymerization stage (I), can be effected in various ways. For instance, the polymer can be brought into contact, for a time ranging from 1 minute to some hours, with a hydrocarbon solvent containing said deactivating compound in solution, suspension or dispersion. An example of dispersion of the deactivating compound is a hydrocarbon solvent is represented by humidified hexane or propane.

In treatment (b, the product obtained in the first stage of polymerization (I), and optionally treated according to step (a), is contacted with one or more late transition metal complexes, optionally in the presence of suitable activating agents.

Said transition metal complex preferably corresponds to formula (I) or (II):

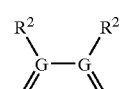  (I)

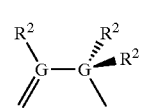  (II)

wherein M is a metal belonging to Group 8, 9, 10 or 11 of the Elements (new IUPAC notation);

L is a bidentate or tridentate ligand of formula (III):

  (III)

wherein:

B is a $C_1$–$C_{50}$ bridging group linking $E^1$ and $E^2$, optionally containing one or more atoms belonging to Groups 13–17 of the Period Table;

$E^1$ and $E^2$, the same or different from each other, are elements belonging to Group 15 or 16 of the Period Table and are bonded to said metal M;

the substituents $R^1$, the same or different from each other, are selected from the group consisting of hydrogen, linear or branched, saturated or unsaturated $C_1$–$C_{20}$ alkyl, $C_1$–$C_{20}$ alkyliden, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (such as B, Al, Si, Ge, N, P, O, S, F and Cl atoms); or two $R^1$ substituents attached to the same atom $E^1$ or $E^2$ form a saturated, unsaturated or aromatic $C_4$–$C_8$ ring, having from 4 to 20 carbon atoms;

m and n are independently 0, 1 or 2, depending on the valence of $E^1$ and $E^2$, so to satisfy the valence number of $E^1$ and $E^2$; q is the charge of the bidentate or tridentate ligand so that the oxidation state of $MX_pX$'s or MA is satisfied, and the compound (I) or (II) is overall neutral;

X, the same or different from each other, are monoanionic sigma ligands selected from the group consisting of hydrogen, halogen, —R, —OR, —$OSO_2CF_3$, —OCOR, —SR, —$NR_2$ and —$PR_2$ groups, wherein the R substituents are linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl or $C_7$–$C_{20}$ arylalkyl radicals, optionally containing one or more atoms belonging to groups 13–17 of the Periodic Table of the Elements (new IUPAC notation), such as B, N, P, Al, Si, Ge, O, S and F atoms; or two X groups form a metallacycle ring containing from 3 to 20 carbon atoms; the substituents X are preferably the same;

X' is a coordinating ligand selected from mono-olefins and neutral Lewis bases wherein the coordinating atom is N, P, O or S;

p is an integer ranging from 0 to 3, so that the final compound (I) or (II) is overall neutral;

s ranges from 0 to 3; and A is a π-allyl or a π-benzyl group.

According to a preferred embodiment of the present invention, the bridging group B corresponds to a structural formula selected from the group consisting of:

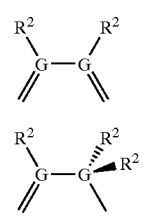

B-1

B-2

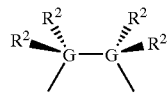
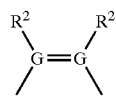
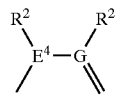
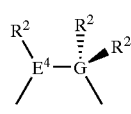
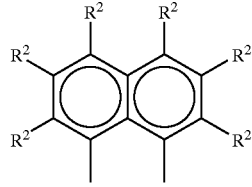
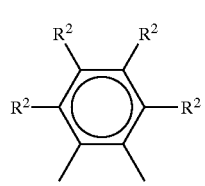
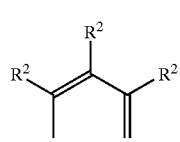
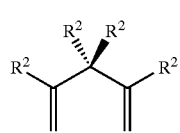
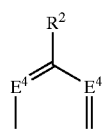
B-3
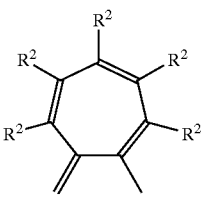
B-4
B-5
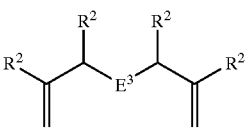
B-6
B-7
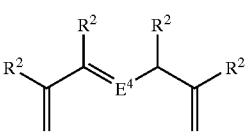
B-8
B-9
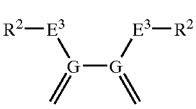
B-10
B-11
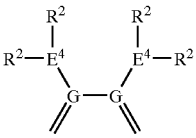
B-12
B-13
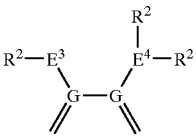
B-14
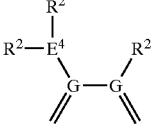
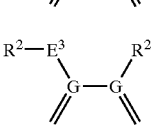
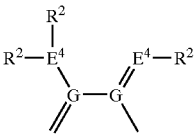
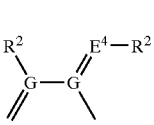
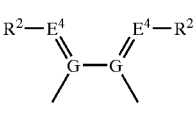
B-15
B-16
B-17
B-18
B-19
B-20
B-21
B-22
B-23
B-24
B-25

-continued

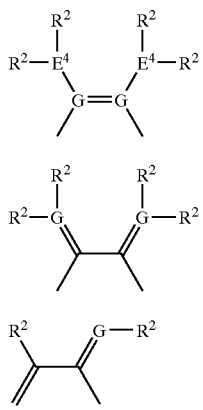

wherein G is an element belonging to Group 14 of the Periodic Table, and is preferably C, Si or Ge; r is an integer ranging from 1 to 5; $E^3$ is an element belonging to Group 16 and $E^4$ is an element belonging to Group 13 or 15 of the Periodic Table;

the substituents $R^2$, the same or different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table (such as B, Al, Si, Ge, N, P, O, S, F and Cl atoms); or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 atoms and optionally containing one or more Group 13–16 element.

In the bidentate or tridenate ligand L of formula (III), $E^1$ and $E^2$ belong to Group 15 to 16 of the Periodic Table, and preferably are selected from the group consisting of N, P, O, and S.

In the late transition metal compounds of formula (I) or (II), the substituents $R^1$, the same or different from each other, are preferably bulky groups; more preferably, they are $C_6$–$C_{20}$ aryl groups, and even more preferably are substituted in the 2 and 6 positions with a $C_1$–$C_{10}$ alkyl group. The substituents X are preferably hydrogen, methyl, phenyl, Cl, Br or I; p is preferably 1, 2 or 3. When X' is a neutral Lewis base wherein the coordinating atom is N, P, O or S, it is preferably selected from the group consisting of phosphines, amines, pyridines, nitriles, sulfides and ethers; even more preferably, it is selected from the group consisting of triphenylphosphine, tri($C_1$–$C_6$ alkyl)phosphine, tricycloalkyl phosphines, diphenyl alkyl phosphines, dialkyl phenyl phosphines, triphenoxyphosphine, pyridine, di($C_1$–$C_3$ alkyl) ether, tetrahydrofuran and nitriles, especially acetonitrile.

When X' is a mono-olefin, it is a hydrocarbyl group having one carbon-carbon double bond, having form 2 to 20 carbon atoms; preferably is a substituted or unsubstituted $C_2$–$C_6$ alkene.

The variable s is preferably 0 or 1.

A is π-allyl or a π-benzyl group.

By a π-allyl group is meant a monoanionic ligand with 3 adjacent $sp^2$ carbon atoms bound to a metal center in an $\eta^3$ fashion. The three $sp^2$ carbon atoms may be substituted with other hydrocarbyl groups or functional groups. Typical π-allyl groups include:

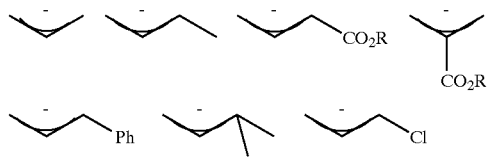

wherein R is hydrocarbyl.

By a π-benzyl group is meant π-allyl ligand in which two of the $sp^2$ carbon atoms are part of an aromatic ring. Typical π-benzyl groups include:

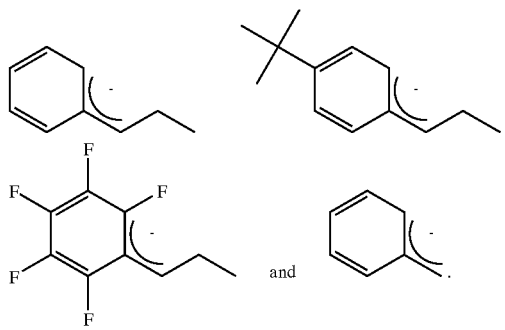

According to a preferred embodiment of the invention, the ligand of formula (II) is bidentate: the bridging group B corresponds to structural formula B-1, wherein G is C, $E^1$ and $E^2$ are N, m and n are 1 and q is 0; said neutral bidentate ligand has formula (V):

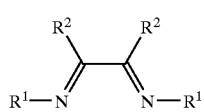

(V)

wherein $R^1$ and $R^2$ have the meaning reported above.

In formula (V), the substituents $R^2$ are preferably the same and are selected from the group consisting of hydrogen, methyl, ethyl, n-propyl, i-propyl and benzyl, or the two substituents $R^2$ form together a mono or polycyclic ring system.

According to a particularly preferred embodiment of the invention, in formula (V) the two substituents $R^2$ from a 1,8-naphthylene group thus resulting a ligand of formula (V)':

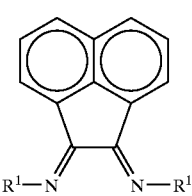

(V)' wherein $R^1$ has the meaning reported above.

In formula (V), the substituents $R^1$ are preferably $C_6$–$C_{20}$ aryl groups, optionally substituted in the 2 and 6 positions with a $C_1$–$C_{10}$ alkyl group; according to preferred embodiments of the invention, $R^1$ is selected from the group consisting of phenyl, 2,6-dimethyl-phenyl, 2,6-diisopropyl-phenyl and 2,4,6-trimethyl-phenyl.

When a catalyst system comprising a transition metal complex of (V) is used in the production of high molecular weight polymers, it is preferred that $R^1$ is aryl substituted in the 2 and 6 positions, and optionally in the 4 position. Useful substituents include alkyl groups containing 1 to 20 carbon atoms, and halo such as chloro. The molecular weight of the polymer produced may be regulated to some extent by the nature of the substitution, if any, in the 2 and/or 6 positions.

When the ligand L corresponds to formula (V), M preferably belongs to Group 10 of the Periodic Table, and even more preferably it is Ni or Pd; if the transition metal compound has formula (I), X radicals are preferably hydrogen, methyl, Cl, Br or I; p is preferably 2 or 3; s is preferably 0.

the ligands of formula (V) and the corresponding complexes with late transition metals can be prepared according to methods known in the state of the art, for instance as described in the international patent application WO 96/23010.

Preferred late transition metal compounds of formula (I), wherein the bidentate ligand L corresponds to formula (V), are reported in the following for illustrative purposes:

[(2,6-iPr$_2$Ph)-N=C(H)-C(H)=N-(2,6-iPr$_2$Ph)]NiBr$_2$
[(2,6-iPr$_2$Ph)-N=C(Me)-C(Me)=N-(2,6-iPr$_2$Ph)]NiBr$_2$
[(2,6-iPr$_2$Ph)-NNphN-(2,6-iPr$_2$pH)]NiBr$_2$
[(2,6-Me$_2$Ph)-N=C(H)-C(H)=N-(2,6-Me$_2$Ph)]NiBr$_2$
[(2,6-Me$_2$Ph)-N=C(Me)-C(Me)=N-(2,6-Me$_2$Ph)]NiBr$_2$
[(2,6-Me$_2$Ph)-NNphN-(2,6-Me$_2$Ph)]NiBr$_2$
[(2-Et-6-Me-Ph)-NNphN-(2-Et-6-Me-Ph)]NiBr$_2$
[(2,6-Et$_2$Ph)-NNphN-(2,6-Et$_2$Ph)]NiBr$_2$
[(2,6-Et$_2$Ph)-NNphN-(2,6-Et$_2$Ph)]Ni(OOCCF(CF$_3$)OC$_3$F$_7$)$_2$
[(2-CF$_3$-6-Me-Ph)-NNphN-(2-CF$_3$-6-Me-Ph)]NiBr$_2$
[(2,4,6-Me$_2$Ph)-N=C(H)-C(H)=N-(2,4,6-Me$_3$Ph)]NiBr$_2$
[(2,4,6-Me$_3$Ph)-N=C(Me)-C(Me)=N-(2,4,6-Me$_3$Ph)]NiBr$_2$
[(2,4,6-Me$_3$Ph)-NNphN-(2,4,6-Me$_3$Ph)]NiBr$_2$
[(2,6-Cl$_2$-4-MeO-Ph)-N=C(Me)-C(Me)=N-(2,6-Cl$_2$-4-MeO-Ph)]NiBr$_2$
[(2-Cl-4,6-Me$_2$-Ph)-N=C(Me)-C(Me)=N-(2-Cl-4,6-Me$_2$-Ph)]NiBr$_2$
[(2-Cl-4,6-Me$_2$-Ph)-NNphN-(2-Cl-4,6-Me$_2$-Ph)]NiBr$_2$
[(2,6-Me$_2$-4-tBu-Ph)-NNphN-(2,6-Me$_2$-4-tBu-Ph)]NiBr$_2$ or the corresponding LNiCl$_2$, LNiMe$_2$, LNiBrCl or LNi-BrMe complexes, L being one of the ligands reported above, wherein Nph has formula (Nph);

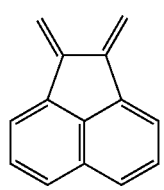

(Nph)

Me=methyl, iPr=iso-propyl, tBu=ter-butyl and Ph=phenyl.

According to another preferred embodiment of the invention, the ligand of formula (III) is tridentate, B corresponds to the structure B-17 wherein the $E^4$ is N, $E^1$ and $E^2$ are N, m and n are 1, and Q is 0; said neutral tridentate ligand has formula (VI):

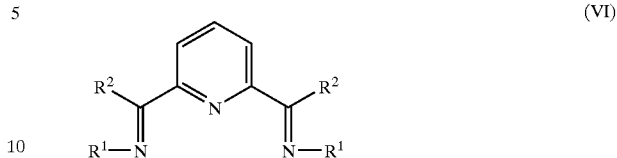

(VI)

wherein the $R^1$ and $R^2$ groups, the same or different from each other, have the meaning reported above.

According to a particularly preferred embodiment of the invention, in the tridentate ligand of formula (VI), the substituents $R^2$ are hydrogen or methyl, and the substituents $R^1$ and aryl rings.

When a catalyst system comprising a transition metal complex of (VI) is used in the production of high molecular weight polymers, it is preferred that $R^1$ is aryl substituted in the 2 and 6 positions, and optionally in the 4 positions. Useful substituents include alkyl groups containing 1 to 20 carbon atoms, and halo such as chloro. The molecular weight of the polymer produced may be regulated to some extent by the nature of the substitution, if any, in the 2 and/or 6 positions.

When the tridentate ligand corresponds to formula (VI), the metal M preferably belongs to Group 8 or 9 of the Periodic Table, and even more preferably it is Fe or Co; if the transition metal compound has formula (I), the X radicals, the same or different from each other, are preferably hydrogen, methyl, Cl Br or I; p is preferably 2 to 3; s is preferably 0.

The ligands of formula (VI) and the corresponding complexes with late transition metals can be prepared according to methods in the state of the art, for instance as described in the international patent applications WO 98/27124 and WO 98/30612.

Preferred late transition metal compounds of formula (I), wherein the ligand L corresponds to formula (VI), are reported in the following for illustrative purposes:

{2,6-[(2,6-iPr$_2$Ph)-N=C(Me)]pyridyl}FeBr$_2$
{2,6-[(2,6-Me$_2$pH)-N=C(Me)]pyridyl}FeBr$_2$
{2,6-[(2,4,6-Me$_3$Ph)-N=C(Me)]pyridyl}FeBr$_2$
{2,6-[(2,6-iPr$_2$Ph)-N=C(Me)]pyridyl}CoBr$_2$
{2,6-[(2,6-Me$_2$Ph)-N=C(Me)]pyridyl}CoBr$_2$
{2,6-[(2,4,6-Me$_3$Ph)-N=C(Me)]pyridyl}CoBr$_2$
{2,6-[(2,6-iPr$_2$Ph)-N=C(Me)]pyridyl}FeBr$_3$
{2,6-[(2,6-Me$_2$Ph)-N=C(Me)]pyridyl}FeBr$_3$
{2,6-[(2,4,6-Me$_3$Ph)-N=C(Me)]pyridyl}FeBr$_3$
{2,6-[(2,6-iPr$_2$Ph)-N=C(Me)]pyridyl}CoBr$_3$
{2,6-[(2,6-Me$_2$Ph)-N=C(Me)]pyridyl}CoBr$_3$
{2,6-[(2,4,6-Me$_3$Ph)-N=C(Me)]pyridyl}CoBr$_3$ or the corresponding chloride complexes (LFeCl$_2$, LCoCl$_2$, LFeCl$_3$ or LCoCl$_3$, L being one of the ligands reported above) or methyl complexes, wherein Me=methyl, iPr=iso-propyl and Ph=phenyl.

According to another embodiment of the invention, the ligand of formula (III) is bidentate: the bridging group B corresponds to the structural formula B-3, wherein G is C, $E^1$ and $E^2$ are N, m and n are 2 and q is 0; said neutral bidentate ligand has formula (VII):

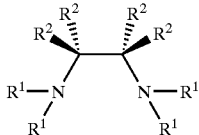

(VII)

wherein $R^1$ and $R^2$ have the meaning reported above.

At least one substituent $R^1$ linked to each N atom is preferably an aryl ring, more preferably substituted in the 2 and 6 positions; according to preferred embodiments of the invention, at least one $R^1$ linked to each N is selected from the group consisting of phenyl, 2,6-dimethyl-phenyl, 2,6-diisopropyl-phenyl and 2,4,6-trimethyl-phenyl. The remaining $R^1$ ligand linked to N is preferably hydrogen, methyl or ethyl.

The substituents $R^2$ are preferably the same and are selected from the group consisting of hydrogen, methyl and phenyl, or two substituents $R^2$ form together a mono or polycyclic ring system, optionally containing one or more Group 13–16 elements.

When the bidentate ligand corresponds to formula (VII), M is preferably of Group 10, and even more preferably is Ni or Pd; if the transition metal compound has formula (I), X radicals are preferably hydrogen, methyl, Cl, Br or I; p is preferably 2 or 3; s is preferably 0.

The ligands of formula (VII) and the corresponding complexes with later transition metals can be prepared according to methods known in the state of the art, for instance as described in the international patent application WO 97/02298.

According to another embodiment of the invention, the ligand of formula (III) is bidentate: the bridging group B corresponds to the structural formula B-18, B-19 or B-20, wherein G is C, $E^1$ and $E^2$ are N, m and n are 1 and q is 0; said neutral bidentate ligands have formulae (VIII)–(XI):

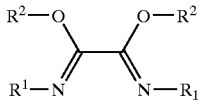

(VIII)

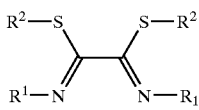

(IX)

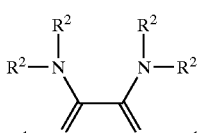

(X)

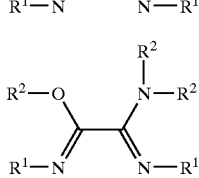

(XI)

wherein $R^1$ and $R^2$ have the meaning reported above.

The substituents $R^1$ are preferably aryl groups, more preferably substituted in the 2 and 6 positions; according to preferred embodiments of the invention, $R^1$ is selected from the group consisting of phenyl, 2,6-dimethyl-phenyl, 2,6-diisopropyl-phenyl and 2,4,6-trimethyl-phenyl.

The substituents $R^2$ are preferably the same and are selected from the group consisting of hydrogen, methyl and phenyl, or two substituents $R^2$ form together a mono or polycyclic ring system, optionally containing one or more Group 13–16 elements; or a substituent $R^1$ and a substituent $R^2$ form together a mono or polycyclic ring system, optionally containing one or more Group 13–16 elements.

When the bidentate ligand corresponds to one of formulae (VIII)–(XI), M is preferably of Group 10, and even more preferably is Ni(II) or Pd(II); if the transition metal compound has formula (I), X radicals are preferably hydrogen, methyl, Cl, Br or I; p is preferably 2 or 3; s is preferably 0.

The ligands formulae (VIII)–(XI) and the corresponding complexes with late transition metals can be prepared according to methods known in the state of the art, for instance as described in the international patent application WO 98/40374.

According to another preferred embodiment of the invention, the ligand of formula (III) is bidentate, B corresponds to the structure B-28 wherein G is C, $E^1$ and $E^2$ are N, a substituent $R^1$ and a substituent $R^2$ form a substituted ring, m and n are 1, and q is −1; said anionic bidentate ligand has formula (XIII):

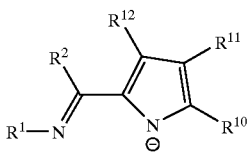

(XII)

wherein $R^1$ and $R^2$ have the meaning reported above and $R^{10}$–$R^{12}$, the same or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (such as B, Al, Si, Ge, N, P, O, S, F and Cl atoms); or two adjacent substituents $R^{10}$–$R^{12}$ form a saturated, unsaturated or aromatic $C_4$–$C_8$ ring, having from 4 to 40 carbon atoms.

According to a particularly preferred embodiment of the invention, in the bidentate ligand of formula (XII), the substituent $R^2$ is hydrogen or methyl; the substituents $R^1$ and $R^{10}$ are steric bulky groups, preferably aryl rings (more preferably substituted in the 2 and 6 positions with branched $C_3$–$C_{30}$ alkyl groups) or tertiary $C_3$–$C_6$ alkyl groups; the substituents $R^{11}$ and $R^{12}$ are preferably hydrogen or methyl.

When the catalyst systems of the invention are used in the production of high molecular weight polymers, having low degrees of branching, $R^1$ and $R^{10}$ are preferably aryl rings substituted in the 2 and 6 positions with a branched $C_3$–$C_{10}$ alkyl groups, having a secondary or tertiary carbon atom bonded to the phenyl group.

When the catalyst systems of the invention are used in the production of lower molecular weight polymers or oligomers, $R^1$ and $R^{10}$ are preferably aryl rings substituted in the 2 and 6 positions with a linear or branched $C_1$–$C_{10}$ alkyl group, having a primary carbon atom bonded to the phenyl group. When the bidenate ligand corresponds to formula (XII), the metal M is preferably Fe, Co, Rh, Ni or Pd; if the transition metal compound has formula (I), X radicals, the same or different from each other, are preferably hydrogen, methyl, Cl Br or I; p is preferably 2 or 3; s is preferably 0.

The ligands of formula (XII) and the corresponding complexes with late transition metals can be prepared according to methods known in the state of the art, for instance as described in the international patent application WO 98/42665.

Preferred late transition metal compounds of formula (I), wherein the ligand L corresponds to formula (XII), are reported in the following for illustrative purposes:

[$C_4H_3N$-C(H)=N-(2,6-i$Pr_2$Ph)]Ni$Br_2$
[$C_4H_3N$-C(Me)=N-(2,6-i$Pr_2$Ph)]Ni$Br_2$
[$C_4H_3N$-C(H)=N-(2,6-$Me_2$Ph)]Ni$Br_2$
[$C_4H_3N$-C(Me)=N-(2,4,6-$Me_3$Ph)]Ni$Br_2$ or the corresponding dichloride, dimethyl, monochloride or monomethyl complexes, wherein Me=methyl, iPr=iso-propyl and Ph=phenyl.

According to another preferred embodiment of the invention, the ligand of formula (III) is bidentate, B corresponds to the structure B-12 wherein two vicinal substituent $R^2$ form an aromatic ring, $E^1$ and $E^2$ are N, m and n are 1, and q is -1; said anionic bidentate ligand has formula (XIII):

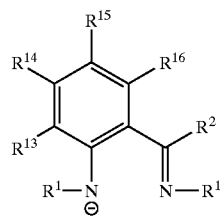

(XIII)

wherein $R^1$ and $R^2$ have the meaning reported above; the substituents $R^{14}$ and $R^{16}$, the same or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (such as B, Al, Si, Ge, N, P, O, S, F and Cl atoms);

the substituents $R^{13}$ and $R^{15}$, the same or different from each other, have the same meaning of substituents $R^{14}$ and $R^{16}$, optionally forming with an adjacent substituent $R^{14}$ or $R^{16}$ a saturated, unsaturated or aromatic $C_4$–$C_8$ ring, or they are electron withdrawing groups.

According to a particularly preferred embodiment of the invention, in the bidentate ligand of formula (XIII), the substituents $R^1$ are steric bulky groups, preferably aryl rings (more preferably substituted in the 2 and 6 positions with branched $C_3$–$C_{30}$ alkyl groups) or tertiary $C_3$–$C_6$ alkyl groups; the substituent $R^2$ is hydrogen or methyl; the substituents $R^{14}$ and $R^{16}$ are hydrogen or methyl; the substituent $R^{13}$ is a steric bulky groups, preferably an aryl ring (more preferably substituted in the 2 and 6 positions with branched $C_3$–$C_{30}$ alkyl groups) or a tertiary $C_3$–$C_6$ alkyl group, or —$NO_2$, Cl or Br; and $R^{15}$ is an electron withdrawing group selected from —$NO_2$, Cl, Br, I, —$CF_3$, —$SO_3$—, —$SO_2$R and —COO$^-$.

When the catalyst systems of the invention are used in the production of high molecular weight polymers, the substituents $R^1$ are preferably aryl groups substituted in the 2 and 6 positions with a branched $C_3$–$C_{30}$ alkyl groups, more preferably having a secondary or tertiary carbon atom bonded to the phenyl group.

When the bidentate ligand corresponds to formula (XIII), the metal M is preferably Fe, Co, Ni or Pd; if the transition metal compound has formula (I), X radicals, the same or different from each other, are preferably hydrogen, methyl, Cl Br or I; p is preferably 2 or 3; s is preferably 0.

The ligands of formula (XIII) and the corresponding complexes with late transition metals can be prepared according to methods known in the state of the art, for instance as described in the international patent application WO 98/42664.

According to another preferred embodiment of the invention, the ligand of formula (III) is bidentate, the bridging group B corresponds to the structural formula B-12, wherein two vicinal substituent $R^2$ form an aromatic ring, $E^1$ is O and $E^2$ is N, m=0, n=1, and q is -1; said anionic bidentate ligand has formula (XIV):

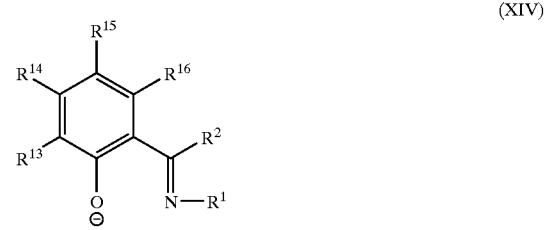

(XIV)

wherein $R^1$ is a steric bulky group, preferably aryl (more preferably substituted in the 2, 6 and/or 4 positions with a substituent selected from halogen and linear or branched $C_1$–$C_{20}$ alkyl groups) or a tertiary $C_3$–$C_6$ alkyl group; the substituent $R^2$ is hydrogen or methyl; the substituents $R^{14}$ and $R^{16}$ are hydrogen, methyl or methoxy; the substituent $R^{13}$ is a steric bulky groups, preferably an aryl ring (more preferably substituted in the 2 and 6 positions with branched $C_3$–$C_{30}$ alkyl groups) or a tertiary $C_3$–$C_6$ alkyl group, —$NO_2$, or halogen (preferably Cl, Br or I); and $R^{15}$ is a steric bulky group (preferably substituted aryl or a tertiary $C_3$–$C_6$ alkyl group) or an electron withdrawing group selected from —$NO_2$, halo (preferably Cl, Br and I), —$CF_3$, —$SO_3$—, —$SO_2$R and —COO$^-$.

When the catalyst systems of the invention are used in the production of high molecular polymers, $R^1$ is preferably an aryl group substituted in the 2 and 6 positions with a branched $C_3$–$C_{20}$ alkyl group, preferably having a secondary or tertiary carbon atom bonded to the phenyl group.

When the bidentate ligand corresponds to formula (XIV), the metal M preferably belongs to Group 10 of the Period Table, and even more preferably is Ni; if the transition metal compound has formula (I), X radicals, the same or different from each other, are preferably hydrogen, methyl, allyl, Cl, Br or I, p is preferably 1 and s is preferably 1; if the transition metal compound has formula (II), A is preferably a linear or branched $C_3$–$C_5$ alkyl, more preferably allyl ($C_3$) itself.

The ligands of formula (XIV) and the corresponding complexes with late transition metals can be prepared according to methods known in the state of the art, for instance as described in the international patent application WO 98/30609 and WO 98/42664.

Preferred late transition metal compounds of formula (I), wherein the ligand L corresponds to formula (XIV), are reported in the following for illustrative purposes:

[{2-O-3-Ph-$C_6H_3$}-CH=N-(2,6-i$Pr_2$-$C_6H_3$)]NiPh(P$Ph_3$)
[{2-O-3-(9-anthracenyl)$C_6H_3$}-CH=N-(2,6-i$Pr_2$-$C_6H_3$)] NiPh(P$Ph_3$)

[{2-O-3,5-tBu$_2$-C$_6$H$_2$}-CH=N-(2,6-iPr$_2$-C$_6$H$_3$)]NiPh (PPh$_3$)
[{2-O-3,5-(NO$_2$)$_2$-C$_6$H$_2$}-CH=N-(2,6-iPr$_2$-C$_6$H$_3$)]NiPh (PPh$_3$)
[{2-O-3-Ph-C$_6$H$_3$}-CH=N-(2,6-iPr$_2$-C$_6$H$_3$)]Ni(C$_3$H$_5$)
[{2-O-3-(9-anthracenyl)C$_6$H$_3$}-CH=N-(2,6-iPr$_2$-C$_6$H$_3$)]Ni (C$_3$H$_5$)
[{2-O-3,5-tBu$_2$-C$_6$H$_2$}-CH=N-(2,6-iPr$_2$-C$_6$H$_3$)]Ni(C$_3$H$_5$)
[{2-O-3,5-(NO$_2$)$_2$-C$_6$H$_2$}-CH=N-(2,6-iPr$_2$-C$_6$H$_3$)]Ni (C$_3$H$_5$)
[{2-O-3-Ph-C$_6$H$_3$}-CH=N-(2,6-Me$_2$-C$_6$H$_3$)]NiPh(PPh$_3$)
[{2-O-3-(9-anthracenyl)C$_6$H$_3$}-CH=N-(2,6-Me$_2$-C$_6$H$_3$)]NiPh(PPh$_3$)
[{2-O-3,5-tBu$_2$-C$_6$H$_2$}-CH=N-(2,6-Me$_2$-C$_6$H$_3$)]NiPh (PPh$_3$)
[{2-O-3,5-(NO$_2$)$_2$-C$_6$H$_2$}-CH=N-(2,6-Me$_2$-C$_6$H$_3$)]NiPh (PPh$_3$)
[{2-O-3-Ph-C$_6$H$_3$}-CH=N-(2,6-Me$_2$C$_6$H$_3$)]Ni(C$_3$H$_5$)
[{2-O-3-(9-anthracenyl)C$_6$H$_3$}-CH=N-(2,6-Me$_2$-C$_6$H$_3$)]Ni (C$_3$H$_5$)
[{2-O-3,5-tBu$_2$-C$_6$H$_2$}-CH=N-(2,6-Me$_2$-C$_6$H$_3$)]Ni(C$_3$H$_5$)
[{2-O-3,5-(NO$_2$)$_2$-C$_6$H$_2$}-CH=N-(2,6-Me$_2$-C$_6$H$_3$)]Ni (C$_3$H$_5$)

wherein Me+methyl, iPr=iso-propyl, tBu=ter-butyl and Ph=phenyl.

According to another preferred embodiment of the invention, the ligand of formula (III) is bidentate, the bridging group B corresponds to the structural formula B-1, a substituent $R^1$ and a substituent $R^2$ form an aromatic ring, $E^1$ and $E^2$ are N, m and n are 1, and q is 0; said neutral bidentate ligand has formula (XV):

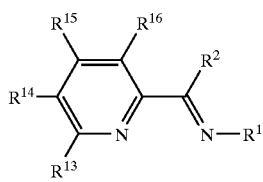

(XV)

wherein $R^1$, $R^2$ and $R^{13}$–$R^{16}$ have the meaning reported above in connection with formula (XIII).

When the bidentate ligand corresponds to formula (XV), the metal M preferably belongs to Group 10 of the Periodic Table, and even more preferably is Ni or Pd; if the transition metal compound has formula (I), X radicals, the same or different from each other, are preferably hydrogen, methyl, Cl, Br or I, p is preferably 2 or 3, and s is preferably 0.

The ligands of formula (XV) and the corresponding complexes with late transition metals can be prepared according to methods known in the state of the art, for instance as described in the international patent application WO 98/49208.

In treatment (b) of the process of the invention, the product obtained in the first stage of polymerization (I) is contacted with one or more late transition metal complexes, optionally in the presence of a suitable activating agent.

Said activating agent is preferably an alumoxane and/or a compound able to form an alkylmetal cation. Suitable activating agents are linear alumoxanes having formula:

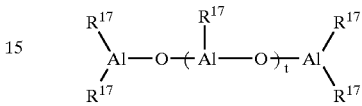

wherein the $R^{17}$ substituents, the same or different from each other, are selected from the group consisting of hydrogen, linear or branched, saturated or unsaturated $C_1$–$C_{20}$-alkyl, $C_3$–$C_{20}$-cycloalkyl, $C_6$–$C_{20}$-aryl, $C_7$–$C_{20}$-alkylaryl and $C_7$–$C_{20}$-arylalkyl radicals, optionally containing Si or Ge atoms; and t is an integer ranging from 0 to 40 and $R^{17}$ has the meaning reported above;

or cyclic alumoxanes having formula:

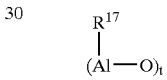

wherein t is an integer ranging from 2 to 40 and $R^{17}$ has the meaning reported above.

Examples of alumoxanes suitable as activating cocatalysts in the catalyst system according to the present invention are methylalumoxane (MAO), 2,4,4-trimethyl-pentylalumoxane (TIOAO), 2-methyl-pentylalumoxane and 2,3-dimethyl-butylalumoxane. Mixtures of different alumoxanes can also be used.

Activating cocatalysts suitable as component (B) in the catalysts of the invention are also the product of the reaction between water and an organometallic aluminum compound; particularly suitable are the organometallic aluminum compounds described in the European patent application EP 0 575 875 (formula (II)) and in the international patent applications WO 96/02580 (formula (II)), WO 99/21899 (formula (II)) and in the European patent application no. 99203110.4 (formula (II)). Non-limiting examples of organometallic aluminum compounds are:

| | |
|---|---|
| tris(methyl)aluminum, | tris(isobutyl)aluminum, |
| tris(2,4,4-trimethyl-pentyl)aluminum | bis(isobutyl)aluminum hydride, |
| bis(2,4,4-trimethylpentyl)aluminum hydride | isobutyl-bis(2,4,4-trimethyl-pentyl)aluminum |
| tris(2,3-dimethyl-hexyl)aluminum | tris(2,3,3-trimethyl-butyl)aluminum |
| tris(2,3-dimethyl-butyl)aluminum | tris(2,3-dimethyl-pentyl)aluminum |
| tris(2-methyl-3-ethyl-pentyl)aluminum | tris(2-ethyl-3-methyl-butyl)aluminum |
| tris(2-ethyl-3-methyl-pentyl)aluminum | tris(2-isopropyl-3-methyl-butyl)aluminum |
| tris(2,4-dimethyl-heptyl)aluminum | tris(2-phenyl-propyl)aluminium |
| tris[2-(4-fluoro-phenyl)-propyl]aluminium | tris[2-(4-chloro-phenyl)-propyl]aluminium |
| tris[2-(3-isopropyl-phenyl)-propyl]aluminium | tris(2-phenyl-butyl)aluminium |
| tris(3-methyl-2-phenyl-butyl)aluminium | tris(2-phenyl-pentyl)aluminium |
| tris[2-(pentafluorophenyl)-propyl]aluminium | tris[2,2-diphenyl-ethyl]aluminium and |
| tris[2-phenyl-2-methyl-propyl]aluminium. | |

Mixtures of different organometallic aluminum compounds and/or alumoxanes can also be used. The molar ratio between aluminum and the metal M of the bridged metallocene compound is preferably comprised between 10:1 and 50,000:1, and more preferably between 100:1 and 4,000:1.

Further alumoxanes suitable as activating agents in the process of the present invention are alkylhaloaluminoxanes, as described in WO 00/22007, and in particular 1,3-dichloro-1,3-diethyldialuminoxane [EtAlCl]$_2$O and 1,3-dichloro-1,3-diisobutylaluminoxane [iBuAlCl]$_2$O.

The activating cocatalyst (B) of the catalyst system of the invention, can be a compound able to form an alkylmetallocene cation; preferably said compounds have formula Y$^+$Z$^-$, wherein Y$^+$ is a Br$\phi$nsted acid, able to donate a proton and to react irreversibly with a substituent X of the metallocene compound of formula (I), and Z$^-$ is a compatible non-coordinating anion, able to stabilize the active catalytic species which results from the reaction of the two compounds and which is sufficiently labile to be displaceable by an olefin substrate. Preferably, the anion Z$^-$ consists of one or more boron atoms. More preferably, the anion Z$^-$ is an anion of the formula BAr$_4$(−), wherein the substituents Ar, the same or different from each other, are aryl radicals such as phenyl, pentafluorophenyl or bis(trifluoromethyl)phenyl. Tetrakis-pentafluorophenyl borate is particularly preferred. Other useful non-coordinating anions Z- can be SbF$_6$-, PF$_6$-, BF$_4$-, trifluoromethanesulphonate and p-toluenesulphonate. Moreover, neutral Lewis acids such as BAr$_3$, SbF$_5$ and BF$_3$ can conveniently be used.

According to a preferred embodiment of the multi-stage process of the invention, in the treatment stage (II), the product obtained in the first polymerization stage (I) is, in the following order:

(a) first contacted with a compound capable of deactivating the catalyst used in stage (I); and (b) then contacted with a late transition metal complex, optionally in the presence of a suitable activating agent.

Preferably, before step (b), any excess of the deactivating compound is removed, according to procedures known in the state of the art.

Step (b) can be advantageously effected by bringing the polymer produced in the first stage of polymerization (I), optionally deactivated according to step (a), into contact with a solution of one or more late transition metal compounds in a solvent, preferably an hydrocarbon solvent selected from benzene, toluene, heptane, hexane, propane and mixtures thereof; in said solution can be dissolved a suitable activating agent as reported above.

Treatment (b) can be carried out by suspending the polymer obtained from stage (I), optionally after the deactivation treatment (a), in a hydrocarbon solvent containing the dissolved compound of late transition metal and optionally a suitable activating agent, generally working at temperature between 0 and 100° C., preferably between 10 and 60° C., and removing the solvent at the end of the treatment. Alternatively, the polymer obtained from stage (I) can be brought into contact, dry, with a solutions of said late transition metal complex containing the minimum possible quantity of solvent necessary to solubilize said compound and wet the polymer.

When the deactivation treatment (a) is carried out after treatment (b), the deactivating agent must selectively deactivate the catalysts used in the first polymerization stage (I), without affecting the catalytic activity of the late transition metal catalyst used in the second polymerization stage (III). Stage (b) may be also carried out in the gas phase in a loop reactor, wherein the polymer produced in the first stage of polymerization is circulated by a stream of inert gas. Solutions of the deactivating compound and of the late transition metal complex can be fed successively, for example using a sprayer, to the loop reactor in the gas phase, and a free-flowing product is obtained at the end of the treatment.

It is an object of the present invention a catalyst component for the polymerization of olefins comprising a late transition metal complex supported on a polymeric porous support, having a porosity, expressed as percentage of voids, greater than 5% said catalyst component can be suitably used in a process for the polymerization of olefins.

It is another object of the present invention a catalyst component comprising a late transition metal complex supported on a polymeric porous support, having a porosity, expressed as percentage of avoids, greater than 5%, said catalyst component being obtainable by a process comprising the following steps:

(I) a polymerization stage, wherein one or more olefins of formula CH$_2$=CHR, wherein R is hydrogen or a linear or branched, saturated or unsaturated C$_1$–C$_{10}$ alkyl, cycloalkyl or aryl radical, in the presence of a catalyst comprising the product of the reaction between one or more alkyl-Al compounds and a solid component comprising at least one compound of a transition metal M$^I$ chosen between Ti and V, and not containing M$^I$-π bonds, and a halide of Mg;

(II) a treatment stage, wherein the product obtained in the polymerization stage (I) is, in any order whatever:

(a) optionally contacted with one or more compounds capable of deactivating the catalyst used in step (I); and (b) contacted with one or more late transition metal complexes, optionally in the presence of a suitable activating agent.

The preferred embodiments of steps (I) and (II) have been described above in details.

The quantity of the late transition and metal complex supported on said polymeric porous support can vary over a very wide range in relation to the late transition metal complex used and the relative amount of product that it produced in the various stages. Preferably, the amount of late transition metal complex ranges from $1.10^{-7}$ to $1.10^{-1}$ mmol per gram of polymeric porous support, more preferably from $1.10^{-6}$ to $1.10^{-3}$, and even more preferably from $1.10^{-5}$ to $1.10^{-4}$. Larger amounts are, however, possible. The polymeric porous support has a porosity, expressed as percentage of voids, greater than 5%, preferably greater than 10% and even more preferably ranging from 35 to 40%.

Moreover, said polymeric porous support is preferably characterized by macroporosity, wherein more than 40% of the porosity is due to pores with diameter greater than 10,000 Å, and more preferably wherein more than 90% of the porosity is due to pores with diameter greater than 10,000 Å.

The second stage of polymerization (III) of the multi-stage process according to the present invention can be carried out in the liquid phase or in the gas phase, working in one or more reactors. The liquid phase can consist of an inert hydrocarbon solvent (suspension process) or of one or more olefinic monomers (liquid monomer process).

The second stage of polymerization (III) is preferably effected in one or more fluidized-bed reactors in the gas phase, into which the product that comes from stage (II) is fed, preferably continuously; recycled monomers, and inert gas and optionally a molecular weight regulator are fed to this stage of polymerization.

The polymerization temperature is preferably comprised between −20° C. and 150° C., more preferably between 10° C. and 100° C., and even more preferably between 40 and 90° C.

The polymerization pressure is preferably comprised between 100 and 100,000 kPa, more preferably between 200 and 8,000 kPa, and even more preferably between 500 and 3,000 kPa.

Reaction times of from 10 minutes to 2 hours have been found to be suitable, depending on the activity of the catalyst system and on the reaction conditions.

The olefinic monomers that can be polymerized in the second stage of polymerization (III) are selected from the group consisting of ethylene, $C_3$–$C_{20}$ α-olefins, $C_4$–$C_{20}$ gem-substituted olefins, $C_8$–$C_{20}$ aromatic substituted α-olefins, $C_4$–$C_{20}$ cyclic olefins, $C_4$–$C_{20}$ non conjugated diolefins and $C_{20}$–$C_{1000}$ vinyl and vinylidene terminated macromers. Moreover, in view of the tolerance of the late transition metal catalysts to polar monomers, in the second polymerization stage ethylenically unsaturated polar monomers can be additionally polymerized or copolymerized. Said preferred polar monomers include $C_4$–$C_{20}$ olefins containing functional groups such as esters, carboxylates, nitriles, amines, amides, alcohols, halide carboxylic acids and the like; said polar monomers are preferably vinyl esters, halides or nitriles. Not all of these olefins will polymerize with all of the above later transition metal complexes. Which combinations of monomer and complex will be active polymerization catalysts may be found in the specific reference cited above.

By means of the process according to the present invention, the catalyst activity of late transition metal systems is unexpectedly enhanced with respect to the systems of the prior art, wherein said catalysts are used in solution, in homogeneous polymerization reactions, or supported on inorganic carriers, as will be demonstrated in the following.

Moreover, the polymers obtained with the multi-stage process of the invention unexpectedly evidence the complete retention of the branching tendency of the late transition metal catalysts, thus showing a good combination of rheological and physico-mechanical properties.

The process of the invention can be used for preparing a wide range of olefinic polymer compositions. In the first polymerization stage (I) of the multi-stage process of the invention are preferably polymerized olefins selected from the group consisting of ethylene, propylene, 1-butene, 1-pentene, 4-methyl-1-pnetene, 1-hexene and 1-octene; in the second polymerization step (III), are preferably polymerized α-olefins selected from the group consisting of ethylene, propylene, 1-butene, 1-pentene, 4-methyl-1-pnetene, 1-hexene and 1-octene, more preferably are obtained ethylene homo and copolymers, and even more preferably ethylene plastomers and elastomers.

According to a preferred embodiment of the multi-stage process of the invention, propylene and ethylene polymer compositions can be prepared: in the first polymerization stage a homo or copolymer of propylene is obtained, having a content of propylene units greater than 80% wt. and cold xylene soluble fractions lesser than 40% wt. said homo or copolymer of propylene consisting of 10–90% wt. of the total amount of polymer. In the second polymerization stage it is produced non-crystalline polyethylene, having a number of total branching greater than 50 branches/1000 C, and preferably greater than 100 branches/1000 C, a density ranging from 0.830 and 0.880 g/cm², and a Tg value lesser than −30° C., and more preferably lesser than −50° C.

Due to the very low Tg obtainable in the second polymerization stage, according to the multi-stage process of the invention, said polymer compositions show an improved balance between stiffness and impact resistance at low temperatures.

According to another preferred embodiment of the process of the invention, polymer compositions can be prepared wherein, in the first polymerization stage is produced polyethylene, polypropylene or propylene/ethylene copolymers, consisting of 10–90% wt. of the total amount of polymer, while in the second polymerization stage block polyethylene (having crystalline and non-crystalline blocks), having a melting point ranging from 100 to 130° C. and a Tg value lesser than −30° C., is produced.

These polymer compositions show a better balance of stiffness, elastomeric properties and resilience at low temperatures, thus allowing the use of these materials in various applications.

According to another preferred embodiment of the process of the invention, polymer compositions can be prepared wherein, in the first polymerization stage, a copolymer of ethylene with one or more α-olefins (LLDPE) is obtained, having a content of ethylene units of 80–90% wt., said copolymer of ethylene consisting of 10–90% wt. of the total amount of polymer; in the second polymerization stage, polyethylene having a low degree of branching is produced, characterized by a number of total branching greater than 5 branches/1000 C, and preferably greater than 10 branches/1000 C, and a density greater than 0.880 g/cm³.

The thus obtained polymer compositions show a better workability and are endowed with improved optical properties with respect to the blends LLDPE/LDPE known in the state of the art.

According to a further embodiment of the process of the invention, the first polymerization step (I) comprises a step (i) of homopolymerization of propylene or of copolymerization of propylene with another α-olefin to form a crystalline polypropylene component and a step (ii) of copolymerization of ethylene with one or more α-olefins, optionally in the presence of a diene, to form a low crystallinity or non-crystalline ethylene/α-olefin copolymer component, said steps (i) and (ii) being carried out in an arbitrary order, so as to form a propylene block copolymer product, for instance as described in WO 00/11057. In the second polymerization stage (III), amorphous polyethylene or block polyethylene containing blocks of amorphous and crystalline polyethylene, or LLDPE, are produced.

The following examples are given for illustrative and not limiting purposes.

The properties stated are determined using the following methods:

Melting Point: Tm values were measure by DSC analysis, using a Mettler instrument. The samples, sealed into aluminum pans, were first heated to 200° C. at 20° C./min and kept at this temperature for 5 minutes. After cooling to 0° C. at 20° C./min. the sample was left for 5 minutes at 0° C. and finally heated to 200° C. at 10° C./min. In this second run, the peak temperature was assumed as melting point (Tm).

Intrinsic viscosity (I.V.): the I.V. of the polymer produced in the polymerization stage (I) was measured in tetrahydronaphtalene (THN) at 135° C. The polymer molecular weights were determined from the viscosity values.

The I.V. of the polymer produced in the polymerization stage (III) was calculated from the I.V. of the matrix produced in the polymerization stage (I), the I.V. of the final product and the amount of polymer produced in stage (II).

Melt Index L (MIL): determined according to ASTM-D 1238, method L.

Content of comonomer: percentage by weight of comonomer determined from IR spectrum; IR analysis were performed on a Nicolet 20 instrument, on samples of 0.1 mm thickness.

Polymer branching: the presence of branches was determined by $^{13}$C-NMR analyses, which were performed on a Bruker DPX 400 MHz instrument, in tetrachlorodideuteroethane at 120° C.

Porosity: the porosity expressed as percentage of voids is determined by absorption of mercury under pressure. The volume of mercury absorbed corresponds to the volume of the pores. For this determination, a calibrated dilatometer (diameter 3 mm) CD3 (Carlo Erba) connected to a reservoir of mercury and to a high-vacuum pump ($1.10^{-2}$ mba) is used. A weighed amount of sample (about 0.5 g) is placed in the dilatometer. The apparatus is then placed under high vacuum (<0.1 mmHg) and is maintained in these conditions for 10 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and the apparatus is pressurized with nitrogen (2.5 kg/cm$^2$). Under the effect of the pressure, the mercury penetrates into the pores and the level goes down according to the porosity of the material. Once the level at which the mercury has stabilized has been measured on the dilatometer, the volume of the pores is calculated from the equation $V=R^2.\pi.\Delta H$, where R is the radius of the dilatometer and $\Delta H$ is the difference in cm between the initial and final levels of the mercury in the dilatometer. By weighing the dilatometer, dilatometer+mercury, dilatometer+mercury+sample, the value of the apparent volume $V_1$ of the sample prior to penetration of the pores can be calculated. The volume of the sample is given by:

$$V_1=[P_1-(P_2-P)]/D$$

where P is the weight of the sample in grams, $P_1$ is the weight of the dilatometer+mercury in grams, $P_2$ is the weight of the dilatometer+mercury+sample in grams, D is the density of mercury (at 25° C.=13.546 g/cm$^3$). The percentage porosity is given by the relation $X=(100.V)/V_1$.

CATALYST COMPONENTS

[(2,6-Et$_2$Ph)-NNphN-(2,6-Et$_2$Ph)]NiBr$_2$.

The catalyst was synthesized according to methods known in the state of the art, as described in the international patent application WO96/23010.

[(2,4,6-Me$_3$Ph)-NNphN-(2,4,6-Me$_3$Ph)]NiBr$_2$

The catalyst was prepared as described in Example 253 of the international patent application WO96/23010.

MAO (methylalumoxane)

A commercial (Witco) 10% w/w toluene solution of MAO (1.7M) was used as such.

M-MAO (modified methylalumoxane)

Modified methylalumoxane MMAO-3A, containing 7 wt % Al in heptane, was purchased from Akzo Nobel.

TIOA (Tris(2,4,4-trimethyl-pentyl)aluminum)

TIOA was purchased from Witco as pure compound and diluted in heptane to obtain a 1M solution.

TIOAO (Tris(2,4,4-trimethyl-pentyl)aluminoxane)

TIOA, obtained as reported above, was diluted to a 1M solution in heptane. 3.45 ml of said solution were added at room temperature to 5 ml of toluene, previously deoxygenated and distilled over triisobutylaluminum, 0.031 ml of H$_2$O were then added at room temperature with a syringe and the resulting solution was stirred for 10 minutes at room temperature.

[iBuAlCl]$_2$O (1,3-dichloro-1,3-diisobutylaluminoxane)

1,3-Dichloro-1,3-diisobutylaluminoxane (0.34M Al in toluene) was supplied by Aldrich.

EXAMPLE 1

Preparation of a homopolymer of propylene [stage (I)]

In a 100 cm$^3$ glass flask, treated beforehand in nitrogen at 90° C. for three hours, 0.0098 g of a solid component containing titanium, prepared according to the procedure of Example 3 in patent EP-A-395083, 0.76 g of triethylaluminum (TEAL) and 0.313 g of cyclohexylmethyldimethoxysilane (CMMS) were previously brought into contact in 10 cm$^3$ of hexane for 5 minutes. The mixture was then fed into a four-liters steel autoclave, treated beforehand with nitrogen at 90° C. for 3 hours. Feed was effected at 30° C. in a propylene atmosphere. 1000 cm$^3$ of H$_2$ and 1.2 kg of propylene were then introduced and the autoclave was heated to 70° C. Polymerization was effected for two hours, followed by degassing in a stream of N$_2$ at 70° C. for 1 hour. 238 g of spherical polymer with the following characteristics were obtained: MIL=3.5; porosity (% voids)=24%.

Treatment of the homopolymer with a deactivating agent [stage (II)(a)]

After degassing propylene, the same reactor was charged with 1000 ml of hexane humidified with 0.513 g of water. It was left in contact with the copolymer at 50° C. for 30 minutes, under nitrogen atmosphere. The liquid was eliminated by siphoning and some washings with cycles of vacuum/nitrogen were carried out at room temperature.

Treatment of the deactivated homopolymer with M-MAO/[2,6-Et$_2$Ph)-NNphN-(2,6-Et$_2$Ph)]NiBr$_2$ mixture [stage (II)(b)] and ethylene polymerization [stage (III)].

100 g of porous deactivated polypropylene, obtained as reported above, were loaded into a 2.6L stainless steel reactor. 500 ml of liquid propane were introduced into the reactor, maintained at 25° C., under a total pressure of 10.4 bar.

At the same time, 4.5 mg (6.78 μmol) of the catalyst [(2,6-Et$_2$Ph)-NNphN-(2,6-Et$_2$Ph)]NiBr$_2$ were dissolved in 10 ml of a solvent mixture consisting of 95% vol toluene and 5% vol. heptane, in a glass vessel, and to the solution was added M-MAO so to obtain a molar ratio Al/Ni=167 (the catalyst concentration was 2.6 μmol/L); the obtained precontact mixture was maintained under stirring for 2 minutes, at room temperature. The obtained catalytic mixture was then loaded into the reactor with a nitrogen overpressure, and stirred for 2–3 minutes. The propane was flashed off in few minutes, while maintaining the temperature at 20–30° C.

Then ethylene was fed all at once to a total pressure of 2,960 kPa (29.6 bar); ethylene concentration was 1.17 mol/L. The polymerization was effected at 55° C. for 2 hours, keeping the pressure constant. After stopping the polymerization reaction by venting off ethylene, the reactor was cooled to room temperature and were obtained 94 g of polymer composition, in the form of spheroid particles having good flowability and containing 30.9% wt. of ethylene polymer.

In the second polymerization stage (III) were produced 29 g of ethylene polymer (activity of 72.8 KgPE/gNi), having Tm=123.4° C. (experimental) and I.V.=5.4 (calculated).

Moreover, the branched polyethylene showed the presence of 30.2 $CH_3$/1000 C, determined by N.M.R. methods.

COMPARATIVE EXAMPLE 1

Polymerization with unsupported catalyst in liquid phase.

1 L of heptane was loaded at room temperature, under ethylene atmosphere, into a purged 2.6 L stainless steel reactor. The temperature was raised to 50° C. and ethylene was fed all at once to obtain a total pressure of 1,430 kPa (14.3 bar).

At the same time, 7.42 μmol of the catalyst [(2,6-$Et_2$Ph)-NNphN-(2,6-$Et_2$Ph)]$NiBr_2$ were dissolved in 6 ml of toluene and 0.54 mmole of M-MAO were added, thus obtained a molar ratio Al/Ni=60; the mixture was then maintained under stirring for few minutes, at room temperature.

The obtained catalytic solution was injected into the reactor with an overpressure of ethylene, together with additional 0.54 mmol M-MAO, so to obtain in the reactor an overall molar ratio Al/Ni= 120 (the concentration of the catalyst was 7.42 μmol/L).

After 30 minutes, at 50° C., the polymerization reaction was stopped by venting off ethylene; the reactor was cooled to room temperature, thus collecting 22 g of a branched ethylene polymer, having I.V. of 3.31 dl/g and a melting temperature Tm of 94.7° C. (activity=41.4 KgPE/gNi).

The obtained ethylene polymer showed the presence of 27.7 $CH_3$/1000 C, determined by N.M.R. methods.

COMPARATIVE EXAMPLE 2

Polymerization with silica-supported catalyst in liquid phase.

Spherical silica (PQ MS 3040, purchased from P. Q. Corporation) with a mean diameter of 95 μm, a surface area of 197 $m^2$/g and pores mean diameter of 131 Å was used; said silica was heated at 250° C. for 2 hours and subsequently at 500° C. for 3 hours.

13.56 g of the aforementioned silica were suspended in 100 ml of toluene containing 15.5 ml of a solution of M-MAO (6.78% wt. in heptane, 1.58 g M-MAO), and the mixture was maintained under stirring for 2 hours, at room temperature. The solid was then filtered, washed and dried under vacuum; the amount of fixed Al was 3.3% wt.

Silica particles were suspended in a solution of 0.2 mmol of the catalyst [(2,6-$Et_2$Ph)-NNphN-(2,6-$Et_2$Ph)]$NiBr_2$ in 100 ml of toluene for 2 hours, at room temperature thus obtaining a molar ratio Al/Ni=138.

1 L of hexane was loaded at room temperature, under ethylene atmosphere, into a purged 2.6 L stainless steel reactor.

Temperature was raised to 55° C. and ethylene was fed all at once to a total pressure of 1,100 kPa (11 bar).

The catalytic suspension obtained as reported above was added to the reactor with an overpressure of ethylene and the feeding barrel was washed with 4 ml of hexane; finally, additionally 0.2 mmol of M-MAO were added, so to obtain in the reactor an overall molar ratio Al/Ni=175 (the catalyst concentration was 4.4 μmol/L) and an ethylene concentration of 1.17 mol/L.

After 2 hours, at 55° C., the polymerization reaction was stopped by venting off ethylene and the reactor was cooled to room temperature, thus collecting 10 g of a branched ethylene polymer, having I.V. of 4.25 dl/g and melting temperature Tm of 120° C. (activity=33.4 KgPE/gNi).

The obtained ethylene polymer showed the presence of 17.8 $CH_3$/1000 C, determined by N.M.R. method.

The above results demonstrate that the polymerization activities of the tested late transition metal catalysts decrease when the same catalyst is supported onto $SiO_2$, even if the supportation confers stability along the time to the catalyst. Unexpectedly, by supporting the late transition metal catalysts on a polymeric porous support, according to the multi-stage process of the invention, the catalyst activity is dramatically increased, under exactly the same polymerization conditions.

In FIG. 1 are plotted the polymerization activities vs. time of late transition metal catalysts used in the $2^{nd}$ polymerization stage of Example 1, according to the invention, used in the unsupported state in homogeneous polymerization (Comparative Example 1) and used supported on silica (Comparative Example 2). The figure clearly shows that, under exactly the same polymerization conditions, late transition metal catalysts are much more active in olefin polymerization when used in the multi-stage process according to the invention than when unsupported or supported on silica, according to prior art processes.

Moreover, as reported in the international patent application WO 97/48736, in comparison with the products obtainable by homogeneous polymerization processes, the immobilization of a late transition metal catalyst on silica leads to relevant modifications in the polymer characteristics; in particular, silica supportation causes a decrease in branching (branches/1000 carbon atoms), leading to polymers having a much lesser number of total branches.

On the opposite, the Applicant has unexpectedly found that the multistage process according to the present invention allows to obtain high polymerization activities, much greater than the ones obtainable with homogeneous and silica-supported catalyst polymerizations, without affecting the branching tendency of the late transition metal catalysts.

EXAMPLE 2

The procedure described in Example 1 was repeated with the only difference that, in stage (II)(b), the catalyst [(2,6-$Et_2$Ph)-NNphN-(2,6-$Et_2$Ph)]$NiBr_2$ was dissolved in 10 ml of a solvent mixture containing 55% vol. toluene, 23% vol. methylene chloride and 22% vol. heptane, in a glass vessel, and to this solution M-MAO was added together with 0.136 mmol of 1-hexane so to obtain a molar ratio Al/Ni=710. The precontact mixture was injected into the reactor as described in Example 1. Then polymerization stage (III) was carried out at a total pressure of 2,500 kPa (25 bar) at 60° C., for 2 hours, thus obtaining 175 g of polymer composition, in the form of spheroid particles having good flowability and containing 42.9% wt. of ethylene polymer.

The ethylene polymer produced in the second polymerization stage (III), with an activity of 188 KgPE/gNi, had Tm=119° C. (experimental), Tc=103.7° C. (experimental) and I.V.=4.2 dl/g (calculated).

EXAMPLE 3

The procedure described in Example 2 was repeated with the only difference that, in stage (II)(b), the precontact solution was prepared by dissolving 2.16 mg (3.39 μmol) of the catalyst [(2,4,6-Me$_3$Ph)-NNphN-(2,4,6-Me$_3$Ph)]NiBr$_2$ in 10 ml of a solvent mixture containing toluene (55% vol.), methylene chloride (23% vol.) and heptane (22% vol.), and by adding M-MAO so to obtain a molar ratio Al/Ni=710. The precontact mixture was treated and injected into the reactor as described in Example 1. Then polymerization stage (III) was carried out at a total pressure of 2,500 kPa (25 bar) at 60° C., for 2 hours, thus obtaining 159 g of polymer composition, in the form of spheroid particles having good flowability and containing 37.1% wt. of ethylene polymer.

The ethylene polymer produced in the second polymerization stage (III), with an activity of 296.2 KgPE/gNi, had Tm=126.3° C. (experimental), Tc=111° C. (experimental) and I.V.=3.8 dl/g (calculated).

EXAMPLE 4

The procedure described in Example 3 was repeated with the only difference that, in stage (II)(b), to the precontact solution prepared by dissolving the catalyst [(2,4,6-Me$_3$Ph)-NNphN-(2,4,6-Me$_3$Ph)]NiBr$_2$ in 10 ml of a solvent mixture containing toluene (55% vol.), methylene chloride (23% vol.), hexane (10.5% vol.) and heptane (11.5% vol.), were further added 0.17 mmol of 1-hexene and M-MAO so to obtain a molar ratio Al/Ni=710.

A polymer composition (150 g), in the form of spheroid particles having good flowability and containing 30.7% wt. of ethylene polymer, was obtained.

The ethylene polymer produced in the second polymerization stage (III), with an activity of 231 KgPE/gNi, had Tm=126.1° C. (experimental), Tc=111.4° C. (experimental), density (calculated)=0.947 g/cm$^3$ and I.V.=2.4 dl/g (calculated).

EXAMPLE 5

The procedure described in Example 1 was repeated with the only difference that, in the stage (II)(b) and in ethylene polymerization [stage (III)], instead of MMAO, was used a mixture of MAO and TIOA, and [(2,4,6-Me$_3$Ph)-NNphN-(2,4,6-Me$_3$Ph)]NiBr$_2$ was used as the catalyst.

More specifically, the precontact solution was prepared by dissolving 2.16 mg (3.39 μmol) of the catalyst [(2,4,6-Me$_3$Ph)-NNphN-(2,4,6-Me$_3$Ph)]NiBr$_2$ in 12 ml of a solvent mixture containing toluene (40% vol.) and heptane (60% vol.); to the obtained mixture were added 0.17 mmol of 1-hexene and a mixture of MAO and TIOA, at a molar ratio MAO/TIOA=4, so to obtain a molar ratio Al/Ni=873. The precontact mixture was treated and injected into the reactor as described in Example 1. Then polymerization stage (III) was carried out at a total pressure of 2,500 kPa (25 bar) at 60° C., for 2 hours, thus obtaining 144 g of polymer composition, in the form of spheroid particles having good flowability and containing 29.1% wt. of ethylene polymer.

The ethylene polymer produced in the second polymerization stage (III), with an activity of 211 KgPE/gNi, had Tm=127° C. (experimental), Tc=112° C. (experimental) and I.V.=3.3 dl/g (calculated).

EXAMPLE 6

The procedure described in Example 5 was repeated with the only difference that, in ethylene polymerization [stage (III)], instead of a mixture of MAO and TIOA, was used a mixture of MAO and TIOAO at a molar ratio MAO/TIOAO=4, so to obtain a molar ratio Al/Ni=873.

A polymer composition (126 g), in the form of spheroid particles having good flowability and containing 19% wt. of ethylene polymer, was obtained.

The ethylene polymer produced in the second polymerization stage (III), with an activity of 120.5 KgPE/gNi, had Tm=126.6° C. (experimental) and Tc=113° C. (experimental).

EXAMPLE 7

The procedure described in Example 5 was repeated with the only difference that, in ethylene polymerization [stage (III)], instead of a mixture of MAO and TIOA, was used a mixture of MAO and TIBA at a molar ratio MAO/TIBA=5, so to obtain a molar ratio Al/Ni=852.

A polymer composition (143.5 g), in the form of spheroid particles having good flowability and containing 30.3% wt. of ethylene polymer, was obtained.

The ethylene polymer produced in the second polymerization stage (III), with an activity of 218.5 KgPE/gNi, had Tm=126.5° C. (experimental), Tc=112° C. (experimental) and I.V.=2.5 dl/g (calculated).

EXAMPLE 8

The procedure described in Example 2 was repeated with the only difference that, in ethylene polymerization [stage (III)], [(2,4,6-Me$_3$Ph)-N=C(An)-C(An)=N-(2,4,6-Me$_3$Ph)]NiBr$_2$ was used as the catalyst and was added an antistatic agent.

More specifically, the precontact solution was prepared by dissolving 2.16 mg (3.39 μmol) of the catalyst [(2,4,6-Me$_3$Ph)-N=C(An)-C(An)=N-(2,4,6-Me$_3$Ph)]NiBr$_2$ in 14 ml of a solvent mixture containing toluene (63% vol.), methylene chloride (27% vol.) and heptane (10T vol.); to the obtained mixture were added 0.17 mmol of 1-hexene and M-MAO so to obtain a molar ratio Al/Ni=900. The precontact mixture was treated and injected into the reactor as described in Example 1. At the beginning of the polymerization stage (III), the antistatic agent ATMER-163 (purchased from ICI; 100 ppm based on the PP produced in the first polymerization stage) was fed along with the monomer as a hexane solution (2 ml) and the polymerization was carried out at a total pressure of 2,500 kPa (25 bar) at 60° C., for 2 hours, thus obtaining 140 g of polymer composition, in the form of spheroid particles having good flowability and containing 28.6% wt. of ethylene polymer. In the second polymerization stage (III) an activity of 201 KgPE/gNi was observed.

The above trial demonstrated that the addition of 100 ppm of antistatic agent, based upon the polyolefin fed as a matrix, is sufficient to increase the final polymer flowability and to avoid the formation of electrostatic charges that may occur with large size reactors and may negatively affect the catalyst productivity.

EXAMPLE 9

The procedure described in Example 8 was repeated, with the only difference that polymerization stage (III) was carried out in the presence of M-MAO at a molar ratio Al/Ni=1200.

A polymer composition (153 g), in the form of spheroid particles having good flowability and containing 34.6% wt. of ethylene polymer, was obtained; in the second polymerization stage (III) an activity of 266.3 KgPE/gNi was observed.

EXAMPLE 10

Preparation of ethylene/1-butene copolymer (LLDPE) [stage (I)]

The synthesis of LLDPE was performed with a catalyst prepared as described in Example 2 of EP-A-553806. 20,1 mg of said catalyst were reacted with 5 mmol of TEA at 25° C., for five minutes, and they were injected into a 4,2 L reactor, under propane atmosphere.

After charging into the reactor 930 g of propane, at 25° C., 178 g of 1-butene and 100 g of ethylene were charged to the reactor within few minutes. At the same time the temperature was raised up to 75° C. and 6,5 normal liters of hydrogen were slowly added.

The polymerization reaction was performed for 2 hours, keeping the pressure constant by feeding both the monomers at constant ratio.

439 g of LLDPE were obtained, having I.V.=2,07 and 1-butene=9,1% wt. by IR.

Treatment of the copolymer with a deactivating agent [stage (II)(a)]

After degassing the reactor used in stage (I), the same reactor was charged with 1000 ml of hexane humidified with 0.513 g of water. It was left in contact with the polymer at 50° C. for 30 minutes, under nitrogen atmosphere. The liquid was eliminated by siphoning and some washings with cycles of vacuum/nitrogen were carried out at room temperature.

Treatment of the deactivated copolymer with M-MAO/[2,4,6-Me$_3$Ph)-N=C(An)-C(An)=N-(2,4,6-Me$_3$Ph)]NiBr$_2$ mixture [stage (II)(b)] and ethylene polymerization [stage (III)]

58 g of porous deactivated ethylene/1-butene copolymer, obtained as reported above, were loaded into a 2.6L stainless steel reactor. 500 ml of liquid propane were introduced into the reactor, maintained at 25° C., under a total pressure of 10.4 bar.

At the same time, 2.16 mg (3.39 μmol) of the catalyst [(2,4,6-Me$_3$Ph)-N=C(An)-C(An)=N-(2,4,6-Me$_3$Ph)]NiBr$_2$ were dissolved in 14 ml of a solvent mixture containing toluene (63% vol.), methylene chloride (27% vol.) and heptane (10% vol.), in a glass vessel; to the obtained mixture were added 0.17 mmol of 1-hexane and M-MAO so to obtain a molar ratio al/Ni=900.

The obtained precontact mixture was maintained under stirring for 2 minutes, at room temperature, and was then loaded into the reactor with a nitrogen overpressure, and stirred for 2–3 minutes. The propane was flashed off in few minutes, while maintaining the temperature at 20–30° C.

Then ethylene was fed up all at once to a total pressure of 2,500 kPa (25 bar) and 100 ppm of the antistatic agent ATMER-163 (purchased from ICI) were fed along with the monomer as a hexane solution (2 ml). The polymerization was effected at 60° C. for 1 hour, keeping the pressure constant.

After stopping the polymerization reaction by venting off ethylene, the reactor was cooled to room temperature and 100 g of polymer composition was obtained, in the form of spheroid particles having good flowability and containing 42% wt. of ethylene polymer produced in the second polymerization stage (III) (activity of 211 KgPE/gNi).

EXAMPLE 11

Preparation of a propylene/ethylene copolymer [stage (I)]

In a 100 m$^3$ glass flask, treated beforehand in nitrogen at 90° C. for three hours, 21 mg of a solid component containing titanium, prepared according to the procedure of Example 3 in patent EP-A-395083, 1.14 g (10 mmol) of triethylaluminum (TEAL) and 114 mg (0.5 mmol) of dicyclooentyldimethoxy-silane were previously brought into contact in 10 cm$^3$ of hexane for 5 minutes. The mixture was then fed into a 4-liters steel autoclave, treated beforehand with nitrogen at 90° C. for 3 hours. Feed was effected at 30° C. in a propylene atmosphere. 2900 cm$^3$ of H$_2$, 1280 g of propylene and 8.5 g of ethylene were then introduced and the autoclave was heated to 70° C. Polymerization was effected at a constant temperature of 70° C., at 31.2 barg and the pressure was kept constant by feeding 30 g of ethylene. After 30 minutes of polymerization, the autoclave was degassed with a stream of N$_2$, at 70° C. for 1 hour. 225 g of spherical propylene/ethylene polymer with the following characteristics were obtained: ethylene content=3.1% wt.; MIL=25.6; porosity (% voids)=27%; I.V.=1.35 dl/g; solubility (in xylene, at 25° C.)=5% wt.

Treatment of the propylene/ethylene copolymer with a deactivating agent [stage (II)(a)]

After degassing, the same reactor was charged with 1000 ml of hexane humidified with 0.52 g of water. It was left in contact with the polymer at 50° C. for 30 minutes, under nitrogen atmosphere. The liquid was eliminated by siphoning and some washings with cycles of vacuum/nitrogen were carried out at room temperature.

Treatment of the deactivated propylene/ethylene copolymer with M-MAO/[(2,4,6-Me$_3$Ph)-N=C(An)-C(An)=N-(2,4,6-Me$_3$Ph)]NiBr$_2$ mixture [stage (II)(b)]and ethylene polymerization [stage (III)]

70 g of porous deactivated propylene/ethylene copolymer, obtained as reported above, were loaded into a 2.6L stainless steel reactor. 250 g of propane were introduced into the reactor, maintained at 30° C. under a total pressure of 10.4 bar; moreover, 3.39 mmol of M-MAO, diluted in 4 ml of heptane, were introduced in the reactor.

At the same time, 2.16 mg of the catalyst [(2,4,6-Me$_3$Ph)-N=C(An)-C(An)=N-(2,4,6-Me$_3$Ph)]NiBr$_2$ were dissolved in 6 ml of a solvent mixture consisting of 66% vol toluene and 34% vol. heptane, in a glass vessel, and to the solution was added M-MAO so to obtain a molar ratio Al/Ni=100; the obtained precontact mixture was maintained under stirring for 10 minutes, at room temperature.

The obtained catalytic mixture was then loaded into the reactor with a nitrogen overpressure (thus obtaining a molar ratio Al/Ni=1100) and stirred for 2–3 minutes. The propane was flashed off in few minutes, while maintaining the temperature at 20–30° C.

Then ethylene was fed all at once to a total pressure of 2,500 kPa (25 bar); the polymerization was effected at 60° C. for 2 hours, keeping the pressure constant.

After stopping the polymerization reaction by venting off ethylene, the reactor was cooled to room temperature and were obtained 149 g of polymer composition, in the form of spherical particles having good flowability and containing 53% wt. of ethylene polymer.

In the second polymerization stage (III) were produced 79 g of ethylene polymer (activity of 397 KgPE/gNi), having Tm=130° C. (experimental) and I.V.=2.06 dl/g (calculated).

EXAMPLE 12

The procedure described in Example 11 was repeated with the difference that, in stage (II)(b), in the reactor were introduced 250 g of propane and [iBuAlCl]$_2$O, diluted in 2 ml of heptane, instead of M-MAO.

Moreover, in the precontact solution, 0.87 ml of [iBuAlCl]$_2$O (0.34 M), diluted in 5.0 ml of toluene, were used instead of M-MAO, so to obtain a molar ratio Al/Ni=200.

The precontact mixture was treated and injected into the reactor, as described in Example 11, so to obtain a molar ratio Al/Ni=1100; polymerization stage (III) was carried out as in Example 11, thus obtaining 116.5 g of polymer composition, in the form of spherical particles having good flowability and containing 39.9% wt. of ethylene polymer.

In the second polymerization stage (III) were produced 46.5 g of ethylene polymer (activity of 234 KgPE/gNi), having Tm=124° C. (experimental) and I.V.=1.83 dl/g (calculated).

EXAMPLE 13

The procedure described in Example 11 was repeated with the difference that, in stage (II)(b), in the reactor were introduced 250 g of propane and M-MAO, diluted in 5.3 ml of heptane.

Moreover, in the precontact solution, 0.43 ml of [iBuAlCl]$_2$O (0.34 M), diluted in 4.4 ml of toluene, were used instead of M-MAO, so to obtain a molar ratio Al/Ni=100.

The precontact mixture was treated and injected into the reactor, as described in Example 11, so to obtain a molar ratio Al/Ni=1100; polymerization stage (III) was carried out as in Example 11, thus obtaining 155.7 g of polymer composition, in the form of spherical particles having good flowability and containing 53.7% wt. of ethylene polymer.

In the second polymerization stage (III) were produced 85.7 g of ethylene polymer (activity of 431 KgPE/gNi), having Tm=129° C. (experimental) and I.V.=1.95 dl/g (calculated).

What is claimed is:

1. A multi-stage process for the polymerization of olefins comprising:
   (I) a first polymerization stage, wherein one or more olefins of the formula CH$_2$=CHR, wherein R is selected from the group consisting of hydrogen, a linear or branched, saturated or unsaturated C$_1$–C$_{10}$ alkyl, a cycloalkyl and an aryl radical, are polymerized in one or more reactors, in the presence of a catalyst comprising the product of the reaction between an alkyl-Al compound and a solid component comprising at least one compound of a transition metal M$^I$ chosen from Ti and V, and not containing M$^I$-π bonds, and a halide of Mg, in order to produce an olefinic polymer having porosity, expressed as the percentage of voids, greater than 5%;
   (II) a treatment stage, wherein the product obtained in said first polymerization stage (I) is, in any order whatever:
      (a) contacted with a compound capable of deactivating the catalyst used in stage (I); and
      (b) contacted with a late transition metal complex, optionally in the presence of a suitable activating agent; and
   (III) a second polymerization stage, wherein one or more olefinic monomers are polymerized in one or more reactors, in the presence of the product obtained from stage (II);

wherein the amount of polymer produced in the first polymerization stage (I) is between 10 and 90% by weight relative to the total amount of polymer produced in stages (I) and (III).

2. The multi-stage process according to claim 1 wherein, in stage (I), said alkyl-Al compound is a trialkyl-Al, an alkyl-Al halide or an alkyl-Al sesquichloride, said halide of Mg is MgCl$_2$ and said compound of a transition metal M$^I$ is selected from the group consisting of halides of Ti, halo alkoxides of Ti, VCl$_3$, VCl$_4$, VOCl$_3$ and halo alkoxides of V.

3. The multi-stage process according to claim 2, wherein said compound of a transition metal M$^I$ is selected from the group consisting of TiCl$_4$, TiCl$_3$ and halo alkoxides of the formula Ti(OR$^1$)$_m$X$_n$, wherein R$^1$ is a C$_1$–C$_{12}$ hydrocarbon radical or a —COR$^1$ group, X is halogen and (m+n) corresponds to the oxidation state of Ti.

4. The multi-stage process according to claim 1 wherein, in stage (I), said solid component is in the form of spherical particles having a mean diameter ranging from 10 μm to 150 μm.

5. The multi-stage process according to claim 1, wherein the catalyst used in stage (I) comprises the product of the reaction between an Al-alkyl compound, an electron-donating compound (external donor) and a solid component comprising at least one compound of a transition metal M$^I$ selected from Ti and V and not containing M$^I$-π bonds, a magnesium halide and an electron-donating compound (internal donor).

6. The multi-stage process according to claim 1, wherein the porosity of the olefinic polymer obtained in the first polymerization stage (I) is greater than 10%.

7. The multi-stage process according to claim 6, wherein more than 40% of said porosity is due to pores with diameter greater than 10,000 Å.

8. The multi-stage process according to claim 1 wherein, in the treatment stage (II)(a), said compound capable of deactivating the catalyst used in stage (I) has formula R$^{IV}_{y-1}$XH, wherein R$^{IV}$ is hydrogen or a C$_1$–C$_{10}$ hydrocarbon radical, X is O, N, or S, and y corresponds to the valence of X.

9. The multi-stage process according to claim 8, wherein said compound capable of deactivating the catalyst used in stage (I) is selected from the group consisting of H$_2$O, NH$_3$, H$_2$S, CO, COS, CS$_2$, CO$_2$ and O$_2$.

10. The multi-stage process according to claim 1 wherein, in the treatment stage (II)(b), said late transition metal complex has the formula (I) or (II):

LMX$_p$X's TMA (II)

wherein M is a metal belonging to Group 8, 9, 10 or 11 of the Periodic Table;

L is a bidentate or tridentate ligand of the formula (II):

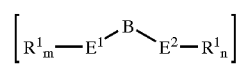

(III)

wherein:

B is a C$_1$–C$_{50}$ bridging group linking E$^1$ and E$^2$, optionally containing one or more atoms belonging to Groups 13–17 of the Periodic Table;

$E^1$ and $E^2$, the same or different from each other, are elements belonging to Group 15 or 16 of the Periodic Table and are bonded to said metal M;

the substituents $R^1$, the same or different from each other, are selected from the group consisting of hydrogen, linear or branched, saturated or unsaturated $C_1$–$C_{20}$ alkyl, $C_1$–$C_{20}$ alkylidene, $C_3$–$C_{20}$ aryl, $C_7$–$C_{20}$ alkylaryl and $C_7$–$C_{20}$ arylalkyl radicals, optionally containing one or more atoms belonging to groups 13–17 of the Period Table of the Elements (such as B, Al, Si, Ge, N, P, O, S, F and Cl atoms); or two $R^1$ substituents attached to the same atom $E^1$ or $E^2$ form a saturated, unsaturated or aromatic $C_4$–$C_8$ ring, having from 4 to 20 carbon atoms;

m and n are independently 0, 1 or 2, depending on the valence of $E^1$ and $E^2$, so to satisfy the valence number of $E^1$ and $E^2$; q is the charge of the bidentate or tridentate ligand so that the oxidation state of $MX_pX$'s or MA is satisfied, and the compound (I) or (II) is overall neutral;

X, the same or different from each other, are monoanionic sigma ligands selected from the group consisting of hydrogen, halogen, —R, —OR, —OSO$_2$CF$_3$, —OCR, —SR, —NR$_2$ and —PR$_2$ groups, wherein the R substituents are selected from the group consisting of linear or branched, saturated or unsaturated, $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table of the Elements (new IUPAC notation); or two X groups form a metallacycle ring containing from 3 to 20 carbon atoms;

X' is a coordinating ligand selected from mono-olefins or neutral Lewis bases wherein the coordinating atom is N, P, O or S;

p is an integer ranging from 0 to 3, so that the final compound (I) or (II) is overall neutral;

s is an integer from 0 to 3; and A is a π-allyl or a π-benzyl group.

11. The multi-stage process according to claim 10, wherein said bridging group B is selected from the group consisting of:

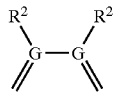

B-1

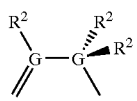

B-2

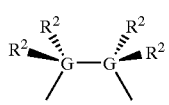

B-3

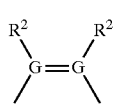

B-4

B-5

-continued

B-6

B-7

B-8

B-9

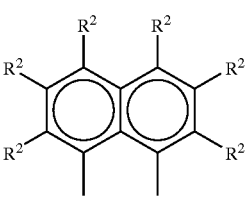

B-10

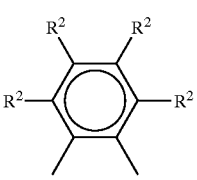

B-11

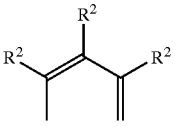

B-12

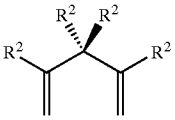

B-13

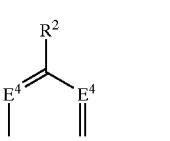

B-14

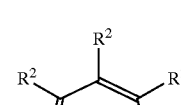

B-15

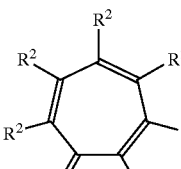

B-16

-continued

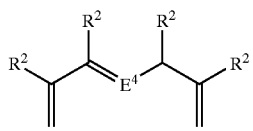
B-17

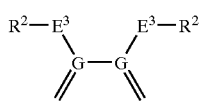
B-18

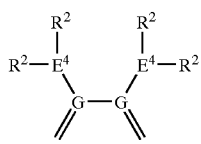
B-19

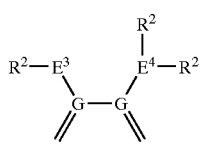
B-20

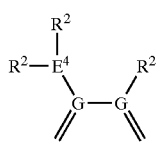
B-21

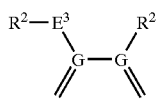
B-22

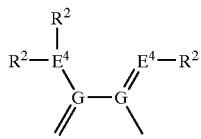
B-23

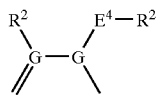
B-24

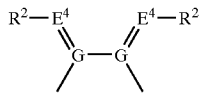
B-25

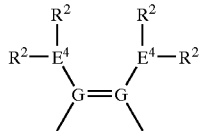
B-26

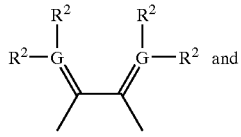
B-27

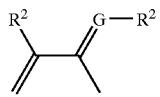
B-28 wherein G is an element belonging to Group 14 of the Periodic Table; r is an integer ranging from 1 to 5; $E^3$ is an element belonging to Group 16 and $E^4$ is an element belonging to Group 13 or 15 of the Periodic Table; the substituents $R^2$, the same different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_1$–$C_{20}$ alkylaryl and $C_7$–$C_{20}$ arylalkyl radicals, optionally containing one or more atoms belonging to groups 13–17 of the Periodic Table; or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element.

12. The multi-stage process according to claim 10, wherein $E^1$ and $E^2$ are selected from the group consisting of N, P, O, and S.

13. The multi-stage process according to claim 10, wherein the substituents $R^1$ are $C_6$–$C_{20}$ aryl groups; the substituents X are selected from the group consisting of hydrogen, methyl, phenyl, Cl, Br and I; and p is an integer from 1 to 3.

14. The multi-stage process according to claim 10, wherein said ligand L corresponds to formula (V):

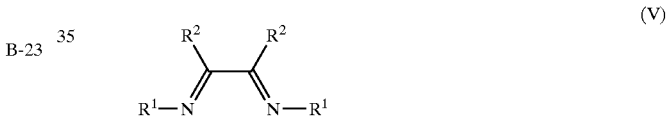

(V)

wherein $R^1$ has the meaning reported in claim 10; the substituents $R^2$, the same or different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; or two $R^2$ substituents form a saturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element;

M belongs to Group 10 of the Periodic Table; X radicals are selected from the group consisting of hydrogen, methyl, Cl, Br and I; p is 2 or 3; and s is 0.

15. The multi-stage process according to claim 14, wherein the substituents $R^1$ are $C_6$–$C_{20}$ aryl groups, optionally substituted in the 2 and 6 positions with at least one of (a) alkyl groups containing 1 to 20 carbon atoms and (b) halo groups; the substituents $R^2$ are selected from the group consisting of hydrogen, methyl, ethyl, n-propyl, i-propyl and benzyl, or the two substituents $R^2$ form together a naphthylene group.

16. The multi-stage process according to claim 10, wherein said ligand L corresponds to formula (VI):

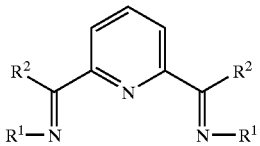

(VI)

wherein the $R^1$ has the meaning reported in claim 10, the substituents $R^2$, the same or different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element; the metal M is Fe or Co; the X radicals are selected from the group consisting of hydrogen, methyl, Cl, Br and I; p is 2 or 3; and s is 0.

17. The multi-stage process according to claim 16, wherein the substituents $R^2$ are hydrogen or methyl, and the substituents $R^1$ are aryl rings.

18. The multi-stage process according to claim 10, wherein said ligand L corresponds to formula (VII):

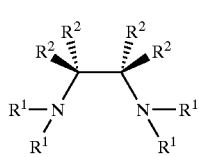

(VII)

wherein $R^1$ has the meaning reported in claim 1, the substituents $R^2$, the same or different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element; M belongs to group 10 of the Period Table, the X radicals are selected from the group consisting of hydrogen, methyl, Cl, Br and I; p is 2 or 3; and s is 0.

19. The multi-stage process according to claim 10, wherein said ligand L corresponds to one of formulae (VIII)–(XI):

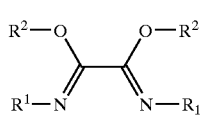

(VIII)

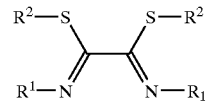

(IX)

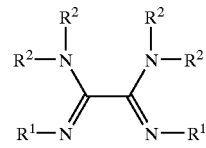

(X)

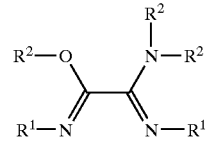

(XI)

wherein $R^1$ has the meaning reported in claim 10, the substituents $R^2$, the same or different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element; M belongs to Group 10 of the Periodic Table, the X radicals are selected from the group consisting of hydrogen, methyl, Cl, Br and I;

p is 2 or 3; and s is 0.

20. The multi-stage process according to claim 10, wherein said ligand L corresponds to formula (XII):

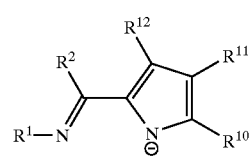

(XII)

wherein $R^1$ has the meaning reported in claim 10; the substituents $R^2$, the same or different from each other, are selected from the group consisting of hydrogen, linear or branched, saturated or unsaturated $C_1$–$C_{20}$ alkyl, $C_1$–$C_{20}$ alkoxy, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; or two $R^2$ substituents form a saturated, unsaturated or aromatic $C_4$–$C_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element; $R^{10}$–$R^{12}$, the same or different from each other, are selected from the group consisting of hydrogen, linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing one or more atoms belonging to groups 13–17 of the Periodic Table; or two adjacent substituents R$^{10}$–R$^{12}$ form a saturated, unsaturated or aromatic C$_4$–C$_8$ ring, having from 4 to 40 carbon atoms;

the metal M is selected from the group consisting of Fe, Co, Rh, Ni and Pd; the X radicals are selected from the group consisting of hydrogen, methyl, Cl, Br and I; p is 2 or 3; and s is 0.

21. The multi-stage process according to claim 10, wherein said ligand L corresponds to formula (XIII):

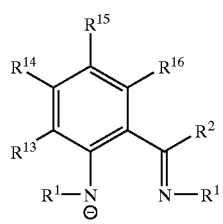

(XIII)

wherein R$^1$ has the meaning reported in claim 10; the substituents R$^2$, the same or different from each other, are selected from the group consisting of hydrogen, linear or branched, saturated or unsaturated C$_1$–C$_{20}$ alkyl, C$_1$–C$_{20}$ alkoxy, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing one or more atoms belonging to groups 13–17 of the Periodic Table; or two R$^2$ substituents form a saturated, unsaturated or aromatic C$_4$–C$_8$ ring, having from 4 to 20 carbon atoms, or they form a polycyclic ring system, optionally containing one or more Group 13–16 elements; a substituent R$^1$ and a substituent R$^2$ may form a substituted or unsubstituted, saturated, unsaturated or aromatic C$_4$–C$_8$ ring, having from 4 to 20 carbon atoms and optionally containing one or more Group 13–16 element; the substituents R$^{14}$ and R$^{16}$, the same or different from each other, are selected from the group consisting of hydrogen, linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing one or more atoms belonging to groups 13–17 of the Periodic Table; the substituents R$^{13}$ and R$^{15}$, the same or different from each other, have the same meaning as substituents R$^{14}$ and R$^{16}$, optionally forming with an adjacent substituent R$^{14}$ or R$^{16}$ a saturated, unsaturated or aromatic C$_4$–C$_8$ ring, or they are electron withdrawing groups; the metal M is selected from the group consisting of Fe, Co, Ni and Pd;

the X radicals are selected from the group consisting of hydrogen, methyl, Cl, Br and I; p is 2 or 3; and s is 0.

22. The multi-stage process according to claim 10, wherein said ligand L corresponds to formula (XIV):

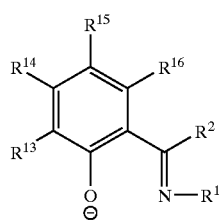

(XIV)

wherein R$^1$ has the meaning reported in claim 10; the substituents R$^2$, the same or different from each other, are selected from the group consisting of hydrogen, linear or branched, saturated or unsaturated C$_1$–C$_{20}$ alkyl, C$_1$–C$_{20}$ alkoxy, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing one or more atoms belonging to groups 13–17 of the Periodic Table; or two R$^2$ substituents form a saturated, unsaturated or aromatic C$_4$–C$_8$ ring, having from 4 to 20 carbon atoms, or they form a polycyclic ring system, optionally containing one or more Group 13–16 elements; a substituted R$^1$ and a substituent R$^2$ may form a substituted or unsubstituted, saturated, unsaturated or aromatic C$_4$– C$_8$ ring, having from 4 to 20 carbon atoms and optionally containing one or more Group 13–16 element; R$^{14}$ and R$^{16}$, the same or different from each other, are selected from the group consisting of hydrogen, linear or branched, saturated or unsaturated C$_1$–C$_{20}$ alkyl, C$_3$–C$_{20}$ cycloalkyl, C$_6$–C$_{20}$ aryl, C$_7$–C$_{20}$ alkylaryl and C$_7$–C$_{20}$ arylalkyl radical, optionally containing one or more atoms belonging to groups 13–17 of the Periodic Table; R$^{13}$ and R$^{15}$, the same or different from each other, have the same meaning as R$^{14}$ and R$^{16}$, optionally forming with an adjacent R$^{14}$ or R$^{16}$ a saturated, unsaturated or aromatic C$_4$–C$_8$ ring, or they are electron withdrawing groups; the metal M belongs to Group 10 of the Periodic Table, the X radicals are selected from hydrogen, methyl, allyl, Cl, Br and I, A is a C$_3$–C$_5$ linear allyl, p is 1 and s is 1.

23. The multi-stage process according to claim 22 wherein, in said ligand of formula (XIV), R$^1$ is aryl, substituted in at least one of the 2, 6 and 4 positions with a substituent selected from the group consisting of halogen, linear or branched C$_1$–C$_{20}$ alkyl groups, and a tertiary C$_3$–C$_6$ alkyl group; R$^2$ is hydrogen or methyl; R$^{14}$ and R$^{16}$ are selected from the group consisting of hydrogen, methyl and methoxy; R$^{13}$ is selected from the group consisting of aryl, substituted in the 2 and 6 positions with branched C$_3$–C$_{30}$ alkyl groups, tertiary C$_3$–C$_6$ alkyl group, —NO$_2$ and halo; and R$^{15}$ is selected from the group consisting of aryl, tertiary C$_3$–C$_6$ alkyl group, —NO$_2$, halo, —CF$_3$, —SO$_3^-$, —SO$_2$R and —COO$^-$.

24. The multi-stage process according to claim 10, wherein said ligand L corresponds to formula (XV):

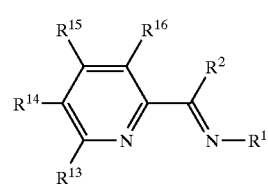

(XV)

wherein R$^1$ has the meaning reported in claim 10; the substituents R$^2$, the same or different from each other, are selected from the group consisting of hydrogen, linear or branched, saturated or unsaturated C$_1$–C$_{20}$ alkyl, C$_1$–C$_{20}$ alkoxy, C$_3$–C$_{20}$ cycloalkyl, C$_6$–C$_{20}$ aryl, C$_7$–C$_{20}$ alkylaryl and C$_7$–C$_{20}$ arylalkyl radicals, optionally containing one or more atoms belonging to groups 13–17 of the Periodic Table; or two R$^2$ substituents form a saturated, unsaturated or aromatic C$_4$–C$_8$ ring, having from 4 to 20 carbon atoms, or they form a polycyclic ring system, optionally containing one or more Group 13–16 elements; a substituent $R^1$ and a substituent $R^2$ may form a substituted or unsubstituted, saturated, unsaturated or aromatic $C_4$–$C_8$ ring, having from 4 to 20 carbon atoms and optionally containing one or more Group 13–16 element; the substituents $R^{14}$ and $R^{16}$, the same or different from each other, are selected from the group consisting of hydrogen, linear or branched, saturated or unsaturated $C_1$–$C_{20}$ alkyl, $C_3$–$C_{20}$ cycloalkyl, $C_6$–$C_{20}$ aryl, $C_7$–$C_{20}$ alkylaryl and $C_7$–$C_{20}$ arylalkyl radicals, optionally containing one or more atoms belonging to groups 13–17 of the Periodic Table; the substituents $R^{13}$ and $R^{15}$, the same or different from each other, have the same meaning of substituents $R^{14}$ and $R^{16}$, optionally forming with an adjacent substituent $R^{14}$ or $R^{16}$ a saturated, unsaturated or aromatic $C_4$–$C_8$ ring, or they are electron withdrawing groups; the metal M belongs to Group 10 of the Periodic Table; the X radicals are selected from the group consisting of hydrogen, methyl, Cl Br and I, p is 2 or 3, and s is 0.

25. The multi-stage process according to claim 1 wherein, in the treatment stage (II)(b), said activating agent is at least one of (a) an alumoxane and (b) a compound able to form an alkylmetal cation.

26. The multi stage process according to claim 1 wherein, in the treatment stage (II), the product obtained in the first polymerization stage (I) is, in the following order:
 (a) first contacted with said compound capable of deactivating the catalyst used in stage (I); and
 (b) then contacted with said late transition metal complex, optionally in the presence of a suitable activating agent.

27. The multi-stage process according to claim 26 wherein, before step (b), any excess of said compound capable of deactivating the catalyst used in stage (I) is removed.

28. The multi-stage process according to claim 1, wherein the polymerization stage (I) is carried out in liquid phase, said liquid phase consisting of a hydrocarbon solvent or of one or more olefins $CH_2$=CHR, and the polymerization stage (III) is carried out in gas phase, in at least one reactor with a fluidized bed or a mechanically-agitated bed.

29. The multi-stage process according to claim 1, wherein both polymerization stages (I) and (III) are carried out in gas phase, in reactors with a fluidized bed or a mechanically-agitated bed.

* * * * *